(12) United States Patent
Hoepner

(10) Patent No.: US 8,751,357 B1
(45) Date of Patent: Jun. 10, 2014

(54) INVESTMENT PERFORMANCE MEASUREMENT

(75) Inventor: Andreas G. F. Hoepner, St. Andrews (GB)

(73) Assignee: University Court of the University of St Andrews, St Andrews (GB)

( * ) Notice: Subject to any disclaimer, the term of this patent is extended or adjusted under 35 U.S.C. 154(b) by 64 days.

(21) Appl. No.: 13/398,244

(22) Filed: Feb. 16, 2012

Related U.S. Application Data

(60) Provisional application No. 61/445,948, filed on Feb. 23, 2011.

(51) Int. Cl.
*G06Q 40/06* (2012.01)
*G06Q 40/00* (2012.01)

(52) U.S. Cl.
CPC .............. *G06Q 40/06* (2013.01); *G06Q 40/00* (2013.01)
USPC .......................................... 705/36 R; 705/35

(58) Field of Classification Search
CPC ............................... G06Q 40/06; G06Q 40/00
USPC ........................................... 705/36, 35, 36 R
See application file for complete search history.

(56) References Cited

PUBLICATIONS

Short (Short, Wesley James, "Not the Sharpest Tool in the Box", Oct. 8, 2010, UMEA School of Business, Bachelor of Arts Thesis, pp. 1-56, http://umu.diva-portal.org/smash/get/diva2:379322/FULLTEXT01).*
Israelsen (Israelsen, Craig L., "Sharpening the Sharpe Ratio"; Financial Planning Magazine, Jan. 2003, pp. 1-3, http://investor.financialcounsel.com/Articles/Investment/ARTINV0000130-SharpeRatio.asp).*
Israelsen, Craig L.: "A refinement to Sharpe ratio and information ratio"; Journal of asset Mangement, vol. 5 (2005) pp. 423-427.
Sortino, Frank A. et al.: "Downside risk—Capturing what's at stake in investments situations"; The Journal of Portfolio Management, vol. 17, Summer 1991, pp. 27-31.
Sharpe, William F.: "Morningstar's Risk-Adjusted Ratings"; Financial Analysts Journal, Jul./Aug. 1998, pp. 21-33.
Gregoriou, Greg N. et al.: "Risk-Adjusted Performance of Funds of Hedge Funds Using a Modified Sharpe Ratio"; The Journal of Wealth Management, Winter 2003, pp. 77-83.
Israelsen, Craig L.: "Sharpening the Sharpe Ratio"; Financial Planning Magazine, Jan. 2003, pp. 1-3, URL:http://investor.financialcounsel.com/Articles/Investment/ARTINV0000130-SharpteRatio.asp.

* cited by examiner

*Primary Examiner* — Ella Colbert
*Assistant Examiner* — Abdulmajeed Aziz
(74) *Attorney, Agent, or Firm* — W. Kevin Ransom; Moore & Van Allen PLLC

(57) ABSTRACT

Embodiments of the invention are directed to a system, method, or computer program product for evaluating risk adjusted performance of an investment portfolio. This invention may be applied to any asset which has a value. The invention evaluates risk adjusted performance of an investment portfolio by first determining at least one positive utility concept and at least one negative utility concept describing an asset. Then, the invention normalizes the at least one negative utility concept to an equivalent negative utility concept describing or deriving from a group of assets. Finally, the invention may relate at least one positive utility concept and at least one normalized negative utility concept to determine a performance measure. In this way, the invention normalized negative asset returns such that better investor utility ratings are not falsely provided.

37 Claims, 8 Drawing Sheets

INVESTMENT PERFORMANCE MEASUREMENT

FIELD OF THE INVENTION

The present invention relates to a method and system for evaluating risk adjusted performance of an investment portfolio or strategy.

BACKGROUND OF THE INVENTION

Sharpe introduced his reward per unit of variability ratio as the difference between the mean return on a portfolio ($\bar{r}_p$) and the mean risk free rate ($\bar{r}_f$) divided by the standard deviation of the portfolio's excess return over the risk free rate, denoted $\sigma_{xp}$, as shown in equation (1):

$$S_p = \frac{\bar{r}_p - \bar{r}_f}{\sigma_{xp}} \tag{1}$$

The Sharpe ratio is recommended by Capital Asset Pricing Theory and theoretical writings on investment portfolio performance evaluation as the best measure for the evaluation of the risk adjusted investment performance of an investor's entire portfolio. Hence, it can fairly be argued to represents one of the best investment performance measure for the average individual investor.

Despite being considered by many as the most popular investment performance measure, the Sharpe ratio carries a major reliability burden. This is because when an asset experiences a negative average excess return, the Sharpe ratio indicates better investor utility ratings the riskier the asset. Many previous studies lack reliability, as they assess negative average excess return assets using the Sharpe ratio without addressing or even acknowledging this problem.

If the Sharpe ratio is used to assess the utility of an asset with negative average excess return, it considers the asset the better the higher its risk. For instance, comparing assets A and B with the average excess returns −5% and −8% as well as the (excess return) standard deviations 10% and 20%, respectively, asset B with the bigger loss and the much higher risk receives the better Sharpe ratio (−0.4 compared to −0.5).

FIG. 1 is a modification of Sharpe's (1998: 31) FIG. 10 titled 'Performance of Two Funds in Bad Times". During times, in which the market return is smaller than the risk free return ($r_f$), it compares the utility resulting for investors from different investment strategies indicated by the points, whereby the Sharpe ratio ascribes all points Y the same utility and the same excess utility over all points X's utility. Hence Sharpe, who only displays the black points, considers any investment Y to be more attractive than any investment X. However, based on the basic axioms that the measurement of investor utility is the original function of any investment performance evaluation measure and that risk has a negative utility, it can be shown that the Sharpe ratio severely lacks reliability in this case, as it recommends investments with the same return but a higher risk (i.e. standard deviation) than an alternative. For instance, the Share ratio recommends investment Y' instead of X', Y'' instead of X, and Y''' instead of X'' in FIG. 1.

FIG. 2 illustrates the negative Sharpe ratio dilemma for an investment with a −100% average excess return and various excess return standard deviation values ranging from 25% to 200%. These high excess return standard deviation values have been chosen to show the effect of marginal increases in excess return standard deviation for both sides of 1 (100%). The return of 100% has been selected to receive a Sharpe ratio of 1 for an excess return standard deviation of 1. As shown by the graph, the Sharpe ratio generally assesses an investment with equal loss but a higher risk with a better, as less negative, investor utility score.

But this negative average excess return problem does not only apply to the Sharpe ratio, it also applies in some form to any measure, which is based on the ratio of return to risk (e.g. Sortino Ratio (Sortino, F. A. and R. van der Meer. (1991) "Downside risk." Journal of Portfolio Management, 17 (4): 27-31) or Modified Sharpe ratio (Gregoriou, G. N. and J.-P. Gueyie. (2003) "Risk-Adjusted Performance of Funds of Hedge Funds using a Modified Sharpe Ratio." Journal of Wealth Management, Winter 2003: 77-83)). The reliability problem of the Sharpe ratio is even greater, if a study analyzes the mean of many funds' Sharpe ratios, since any inclusion of meaningless negative Sharpe ratios into an average Sharpe ratio makes this mean itself over-proportionally more meaningless.

One of several proposals for overcoming the problem with the Sharpe ratio has been suggested by Israelsen. This is described in "Sharpening the Sharpe Ratio." Financial Planning, 33 (1): 49-51, Israelsen (2003) and "A refinement to the Sharpe ratio and information ratio." Journal of Asset Management, 5 (6): 423-427, Israelsen, C. L. (2005). This proposal involves multiplying a portfolio's average excess return with its standard deviation, if the former is negative, as shown in equation (2):

$$I_p = \frac{\bar{r}_{xp}}{\sigma_{xp}^{(\bar{r}_{xp}/|\bar{r}_{xp}|)}} \tag{2}$$

where $I_p$ denotes the Israelsen ratio; $\bar{r}_{xp}$ is the mean excess return of the portfolio over the risk free rate; $|\bar{r}_{xp}|$ is the same mean excess return in absolute terms; and $\sigma_{xp}$ is the standard deviation of the portfolio's excess return. However, a problem with the Israelsen ratio is that it leads to unreliable fund ratings. If the average excess return standard deviation in a sample of funds is far above one, positive Israelsen ratios experience low absolute values, but negative Israelsen ratios show big absolute values. This bias, which Israelsen himself appears to recognize, prohibits the calculation of any reliable average including positive and negative Israelsen ratios.

All other current attempts to solve the negative average excess return problem of the Sharpe ratio or a similar ratio result in investor utility ratings, which themselves face even greater reliability problems than the Israelsen ratio. Hence, no reliable return to risk ratio for the assessment of loss incurring assets appears to currently exist. Given that investors are expected to be especially risk averse, when their investments incur losses and that return to risk ratios are the main means of assessing investors' entire portfolios, this lack of a reliable measure is a problem.

In summary, the Sharpe ratio loses its meaning in case of negative average excess return and hence can be considered an inappropriate measure of investor utility unless all observed relevant average excess returns are positive. Since the negative average excess return problem applies to the Sharpe ratio as well as its common substitutes, investors, fund managers and other financial market participants have a clear, strong need for a Sharpe ratio like measure of investor utility which they can appropriately use for assets with positive or negative average excess return. This need is especially strong for big institutional investors, as they face substantial negative price impacts when attempting to offset a large portion of an asset due to the expectation of negative excess returns.

SUMMARY OF THE INVENTION

According to the present invention, there is provided a method for evaluating risk adjusted performance of an investment portfolio. This method can be applied to any asset, i.e. any thing or concept, which has a value.

According to one aspect of the invention, there is provided a computer processor implemented method for measuring investment performance of an Asset A, the method comprising: determining at least one positive utility concept (PUC) describing Asset A; determining at least one negative utility concept (NUC) describing Asset A; normalizing, using the computer processor, the at least one negative utility concept (NUC) to an equivalent negative utility concept (GNUC) describing or deriving from a group of Assets (N>1); and relating, using the computer processor, the at least one positive utility concept (PUC) and the at least one normalized negative utility concept (NNUC) to determine a performance measure, wherein the step of relating involves division of the positive and normalized negative utilities or multiplication of the positive utility concept by an inverse function of the normalized negative utility concept or equivalent, so the performance measure is higher the lower the negative utility concept and lower the higher the negative utility concept for any non-zero positive utility concept value.

The step of relating may be done using the following relationship:

$$\text{performance measure} = fn_1(\text{PUC}) - fn(fn_2 \bmod (fn_3(\text{PUC}))fn_4(\text{NNUC}))$$

where $fn_1$ and $fn_3$ is are functions acting on the PUC; $fn_2$ is a function acting on the modulus of $(fn_3(\text{PUC}))$ and $fn_4$ is a function acting on the NNUC, and $fn$ is a function of $fn_2 \bmod(fn_3(\text{PUC}))$ and $fn_4(\text{NNUC})$, typically multiplication of $fn_2 \bmod(fn_3(\text{PUC}))$ and $fn_4(\text{NNUC})$. Optionally, $fn_1$ and $fn_3$ are the same. In a specific embodiment, $fn_2$ may be multiplication by 1 and $fn$ may be multiplication of $fn_2 \bmod(fn_3(\text{PUC}))$ and $fn_4(\text{NNUC})$. In this case, the step of relating is done using the following relationship:

$$\text{performance measure} = fn_1(\text{PUC}) - \bmod(fn_3(\text{PUC})) \cdot fn_4(\text{NNUC}).$$

The step of relating may be done using the following relationship:

$$\text{performance measure} = fn_1(\text{PUC}) - fn_2 \bmod(fn_3(\text{PUC})) [C_1 - C_2/fn_5(\text{NNUC})]$$

where C1 and C2 are constants and $fn_3$ represents a function acting on the PUC and fn5 represents a function acting on the NNUC. Optionally, $C_1$ may equal $C_2$, and so in this case, the step of relating may be done using the following relationship:

$$\text{performance measure} = fn_1\text{PUC} + fn_2 \bmod(fn_3\text{PUC})[1/fn_5\text{NNUC} - 1]$$

The step of relating may be done using the following relationship:

$$\text{performance meas} = fn_1\text{PUC} + fn \bmod(fn_3\text{PUC})[(fn\text{GNUC} - fn\text{NUC})/(fn\text{GNUC} + fn\text{NUC})]$$

The step of relating may be done using the following relationship:

$$\text{performance measure} = fn_6\text{PUC}(fn_7\text{GNUC}/fn_8\text{NUC})^{(fn_9\text{PUC}/fn_{10} \bmod \text{PUC})}$$

where $fn_{6-10}$ are functions which may optionally be the same and may be equal to multiplication by 1.

The step of relating may be done using the following relationship:

$$\text{performance measure} = fn_{11}\text{PUC}(fn_{12}\text{GNUC}/fn_{12}\text{NUC})^{((C3+1)fn\text{PUC}/fn \bmod \text{PUC}) - C4}$$

The present invention can be applied to the Sharpe ratio, and other investment performance measures, such as the Sortino ratio (Sortino and van der Meer, 1991). This will be described in more detail later.

The positive utility concept may describe or be a function of Asset A's return. For example, the positive utility concept may describe or be a function of Asset A's excess return over a risk free rate.

The positive utility concept may describe or may be a function of Asset A's excess return over a risk free rate and the negative utility concept may describe or be a function of Asset A's return deviation. The return deviation of the group of Assets (N>1) may be measured over the longest available sample period.

The positive utility concept may describe or be a function of Asset A's excess return over a risk free rate and the negative utility concept may describe or be a function of Asset A's excess return standard deviation. The excess return standard deviation of the group of Assets (N>1) may be measured over the longest available sample period.

According to another aspect of the invention, there is provided a computer processor implemented method for measuring investment performance of an Asset A, the method comprising: determining a positive utility concept (PUC) describing Asset A; determining a negative utility concept (NUC) describing Asset A, wherein the a negative utility concept is a function of a third or higher moment of a return distribution, or a combination of return distribution and at least one other risk characteristics of Asset A; and relating, using the computer processor, a function of the positive utility concept (PUC) to a function of the negative utility concept (NUC) to determine a performance measure, wherein the step of relating involves division of the function of the positive utility concept by the function of the negative utility concept or multiplication of the function of the positive utility concept by an inverse function of the function of the negative utility concept or equivalent, so the performance measure is higher the lower the negative utility concept and lower the higher the negative utility concept for any non-zero positive utility concept value.

The step of relating may be done using the following relationship:

$$\text{performance measure} = fn_1(\text{PUC}) - fn_2(\bmod(fn_3(\text{PUC})) \cdot fn_4(\text{NUC})$$

where $fn_1$ and $fn_3$ is are functions acting on the PUC; $fn_2$ is a function acting on the modulus of $(fn_3(\text{PUC}))$ and $fn_4$ is a function acting on the NUC, wherein $fn_1$ and $fn_3$ may optionally be the same.

Optionally, $fn_2$ is multiplication by 1 and the step of relating is done using the following relationship:

$$\text{performance measure} = fn_1(\text{PUC}) - \bmod(fn_3(\text{PUC})) \cdot fn_4(\text{NUC})$$

The step of relating may be done using the following relationship:

$$\text{performance measure} = fn_1(\text{PUC}) - fn_2 \bmod(fn_3(\text{PUC})) [C_1 - C_2/fn_5(\text{NNUC})]$$

where $C_1$ and $C_2$ are constants, and $fn_{1-5}$ represents functions.

The step of relating may be done using the following relationship:

performance measure=$fn_1$(PUC)-$fn$(mod($fn_3$(PUC))) [1-1/$fn_5$NUC]

The step of relating may be done using the following relationship:

performance measure=$fn_1$PUC+$fn$ mod($fn_3$PUC))[($fn$(GNUC)-$fn$(NUC))/($fn$(GNUC)+$fn$(NUC))]

The step of relating may be done using the following relationship:

performance measure=$fn_6$PUC($fn_7$GNUC/$fn_8$NUC)$^{(fn_9 PUC/fn_{10} mod PUC)}$ wherein $fn_{6-10}$ are functions, which may optionally be the same and may be equal to multiplication by 1.

Optionally, $fn_{6-10}$ are the same and may comprise multiplication by 1.

The step of relating may be done using the following relationship:

performance measure=$fn_{11}$(PUC)($fn_{12}$(NUC)/$fn_{12}$NUC))$^{((C3+1)fnPUC/fn\ mod\ PUC))}$-C4

The positive utility concept may describe or be a function of Asset A's return.

The positive utility concept may describe or be a function of Asset A's excess return over a risk free rate.

The positive utility concept may describe or be a function of Asset A's excess return over a risk free rate and the negative utility concept describes or is a function of Asset A's return deviation. The return deviation of the group of Assets (N>1) may be measured over the longest available sample period.

The positive utility concept may describe or be a function of Asset A's excess return over a risk free rate and the negative utility concept describes or is a function of Asset A's excess return standard deviation. The excess return standard deviation of the group of Assets (N>1) may be measured over the longest available sample period.

BRIEF DESCRIPTION OF THE DRAWINGS

Various aspects of the invention will now be described by way of example only and with reference to the accompanying drawings, of which.

DETAILED DESCRIPTION OF THE INVENTION

The present invention provides a performance measure that can be reliably used even when market conditions are negative. To do this, the performance measure relates a positive utility concept to a negative utility concept in such a manner as to ensure that it is higher the lower the negative utility concept and lower the higher the negative utility concept for any non-zero positive utility concept value. The relationship uses division of the positive utility concept by the negative utility concept (or multiplication with an inverse function or equivalent), where this division is adapted to ensure that the necessary constraints are met, i.e. the performance measure is higher the lower the negative utility concept and lower the higher the negative utility concept for any non-zero positive utility concept value.

The main cause of the negative excess problem of return to risk ratio based performance measures is that, in contrast to positive excess returns, division increases negative excess returns, if the divisor (risk) is above one, but decreases them, if the divisor is below one. This cause can be addressed by a synthetic division process, which decreases negative excess returns, if the risk is greater than one and vice versa. The synthetic division process is based on two knowns: First, while division by a number greater than one increases negative figures, subtraction reduces them. Second, division by a number greater than one can be represented as a subtraction of the difference between the dividend and the quotient from the dividend. To see this, consider that the Sharpe ratio in equation (3) can also be expressed as equation (4):

$$S_p = \frac{\bar{r}_{xp}}{\sigma_{xp}} \quad (3)$$

$$S_p = \bar{r}_{xp} - \left(\bar{r}_{xp} - \frac{\bar{r}_{xp}}{\sigma_{xp}}\right) \quad (4)$$

In equation (3) dividing negative excess returns with its positive utility by the negative utility concept risk leads to a better return/risk score, the higher the negative utility of the risk, since a division by a positive value greater than one decreases positive figures, but increases negative figures. In contrast, a subtraction of any positive subtrahend decreases any minuend—positive or negative. To ensure that a higher negative utility of risk leads to a lower return/risk score for negative portfolio excess returns is to ensure that the term in the brackets in equation (4) receives the same sign in the negative excess return regime as in the positive excess return regime. This can be achieved by multiplying the term in the brackets in equation (4) by the absolute mean return of the portfolio divided by the mean return of the portfolio, to give H$^2$, as shown in equation (5), which can be simplified to equation (6).

$$H_p^2 = \bar{r}_{xp} - \frac{|\bar{r}_{xp}|}{\bar{r}_{xp}}\left(\bar{r}_{xp} - \frac{\bar{r}_{xp}}{\sigma_{xp}}\right) \quad (5)$$

$$H_p^2 = \bar{r}_{xp} - |\bar{r}_{xp}|\left(1 - \frac{1}{\sigma_{xp}}\right) \quad (6)$$

Figure 1:
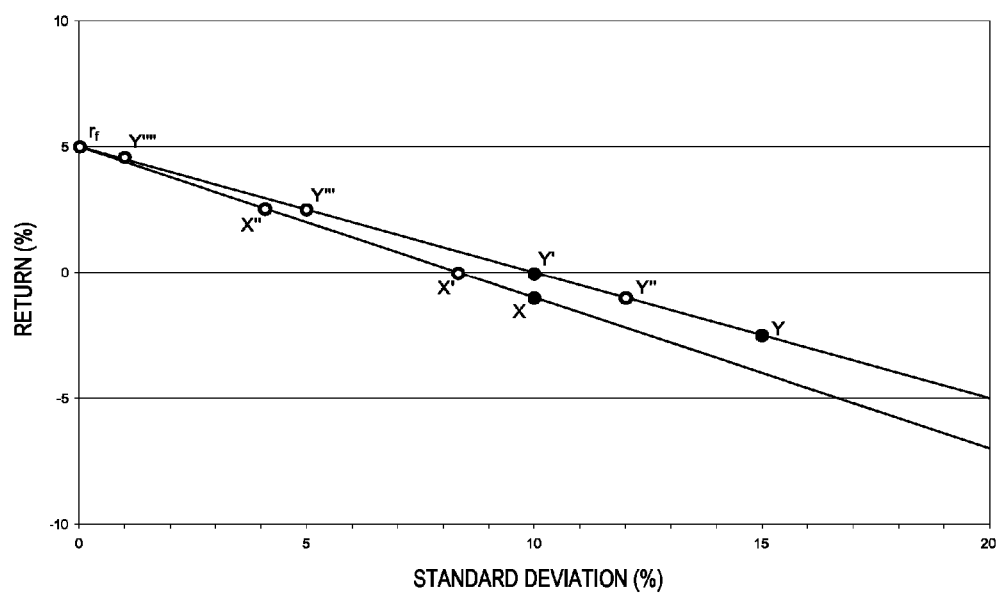
FIG. 1 depicts a modification of Sharpe's ratio.
Figure 2:
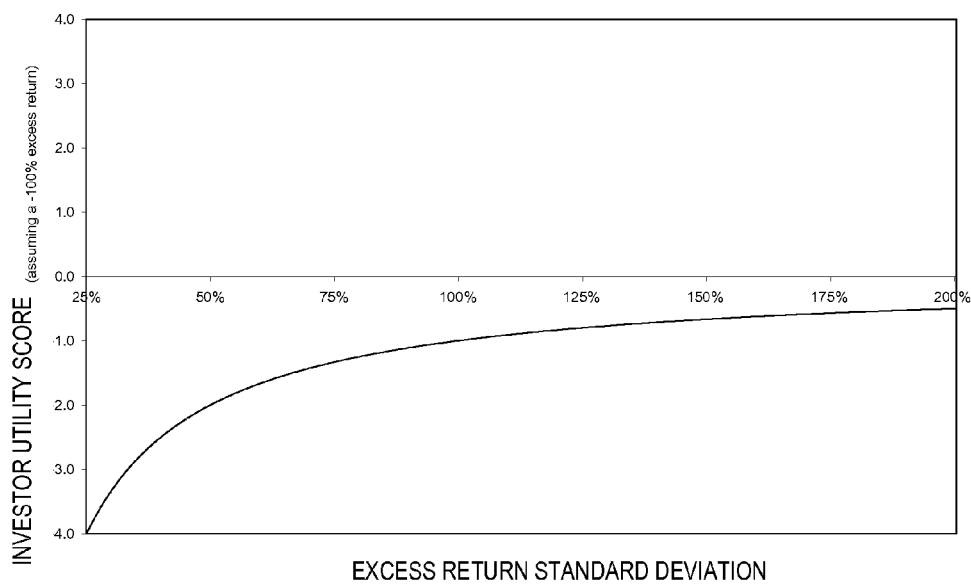
FIG. 2 depicts the negative Sharpe ratio dilemma for an investment with a −100% average excess return and various excess return standard deviation values ranging from 25% to 200%.
Figure 3:
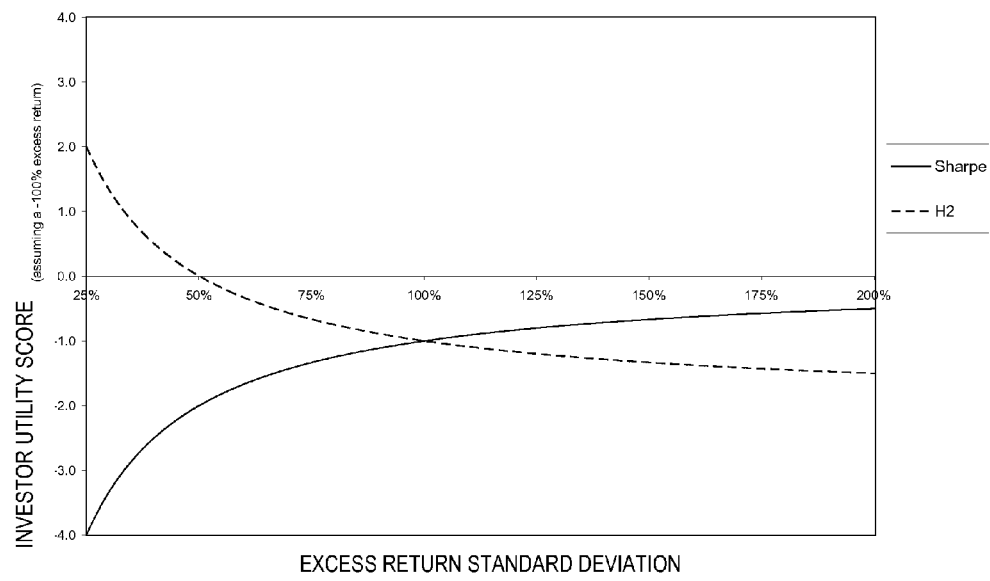
FIG. 3 is a comparison of Sharpe ratio and H$^2$-measure.

As shown in FIG. 3, which uses the same example as FIG. 2, the H$^2$-measure has solved the negative Sharpe ratio problem that higher risk leads to a higher investor utility given negative excess returns. The $H^2$-measure intuitively suggests that an increase in one unit of excess return standard deviation leads to a decrease in investor utility and hence solves the Sharpe ratio's violation of Markowitz's (1952) E-V rule.

FIG. 3 uses the same example as FIG. 2 to compare the effect of an incremental increase in an investment's excess return standard deviation on the investor utility score as calculated with the Sharpe ratio and the $H^2$-measure. While the Sharpe ratio considers investments with higher risk (excess return standard deviation) to result in higher utility, the $H^2$-measure penalizes an investment for an increase in risk and therefore can be considered to be a solution to the Sharpe ratio's violation of Markowitz's (1952) E-V rule.

The $H^2$-measure itself has two problems—one related to the range and one to the curvature of its function of investor utility to negative excess return standard deviation. The problem of the range of the $H^2$-measure's function of investor utility to negative excess return standard deviation is that the function is not bound to negative utility scores. The $H^2$measure suggests, that if the risk of an investment is sufficiently low, the investor experiences a positive utility from losses, which does not only sound intuitively wrong, but can also be shown to be theoretically invalid. Consider that the risk free rate has by definition a zero excess return and a zero excess return standard deviation. Thus, an investor experiences a utility of zero from the risk free asset with zero excess return standard deviation. The risk free asset is the most important benchmark for the utility score estimation of any portfolio, as a higher (lower) utility score of any portfolio can only be justified either by a higher (lower) return or by a lower (higher) risk. But since there cannot be any portfolio with a lower excess return standard deviation than zero, the only justification for a positive utility score is a higher return than the risk free asset, which is defined as a positive excess return. It follows further that the only justification for a zero utility score is at least a zero excess return. Thus, it is theoretically invalid, if an asset with a negative excess return is evaluated with a positive or even zero utility score, as it could possibly happen applying the $H^2$-measure. Hence, the range of the $H^2$-measure's function of investor utility to negative excess return standard deviation needs to be modified.

The curvature related problem is that the incremental investor disutility of negative excess return standard deviation risk is decreasing according to the $H^2$-measure. This property of the $H^2$-measure, however, can be reasoned to contradict the basic axiom of a rational risk averse investor's strictly decreasing incremental utility of wealth, which is derived from a risk averse investor's unwillingness to take an actually fair bet. Changing the perspective from 'utility of wealth' to 'disutility of loss of wealth', it follows that a risk averse investor experiences a strictly increasing incremental disutility of a certain loss of wealth. Risk represents an uncertain loss of wealth. Hence, the function of the disutility of a risk of a loss of wealth can be fairly assumed to represent a transformation of the function of the disutility of a certain loss of wealth, which recognizes the uncertainty inherent in risk. This transformation, however, does not change the strictly increasing nature of the first derivate of the disutility of loss of wealth function.

If rational investors are, as commonly assumed, risk averse to any degree, they can be expected to experience a strictly increasing incremental disutility of risk. Thus, the $H^2$-measure's property of a decreasing incremental disutility of risk given negative excess returns contradicts the basic axiom of a rational risk averse investor's strictly decreasing incremental utility of wealth. Hence, the range and the curvature of the $H^2$-measure's function of investor utility to negative excess return standard deviation need to be adjusted to develop a sound solution for the negative Sharpe ratio problem. However, the $H^2$-measure as well as the Sharpe ratio itself also supports a decreasing incremental disutility of risk of positive excess returns. Despite it being recognized that this similarly contradicts the basic axiom of a rational risk averse investor's strictly decreasing incremental utility of wealth, it is left unchanged because investors are found to be much less risk averse, if a gamble only involves the possibility of achieving higher or lower profits than if they could potentially lose money with their bet. As downwards deviations from positive excess returns can represent lower positive excess returns, while even upwards deviations from negative excess returns can still represent a loss, there is some intuition to expect investors to be less concerned about risk in periods with positive excess return than in periods with negative excess return. Hence, it appears reasonable to treat risk differently for positive and negative Sharpe ratios and $H^2$-measures.

Furthermore, as behavioural finance tells us that individual investors do not always act entirely rational, individual investors might not be risk averse in the commonly assumed form and instead experience a decreasing or a constant incremental disutility of risk. Thus, while these individual investors can be expected to be concerned with the range problem $H^2$-measure's function of investor utility to negative excess return standard deviation, they are not or in a different form concerned about the curvature problem, respectively. Therefore, the range problem is solved first in the following text to provide a sufficient solution for individual investors experiencing a decreasing incremental disutility of risk. Afterwards, the curvature problem is solved in a two-step process, in which the first step provides a solution sufficient for individual investors experiencing a constant incremental disutility of risk and the second step eventually presents the solution for the commonly assumed rational risk averse investor.

To solve the problem that the $H^2$-measure can evaluate negative average excess return portfolios with positive utility scores, it is important to understand its cause. As the Sharpe ratio does not lead to positive utility scores for assets with negative average excess returns, the development of the synthetic division process, which decreases negative excess returns the stronger the greater the risk, has solved the Sharpe ratio dilemma, but apparently included a side effect, which leads to another major problem. To see this side effect, it is useful to distinguish between two scenarios, in which the synthetic division process of equation (5) and (6) is applied. In the first scenario, negative return figures are decreased, as the positive excess return standard deviation figure as measure of risk is greater than one. In the second scenario negative return figures are increased, since the excess return standard deviation is smaller than one.

Decreasing and increasing scenario of the synthetic division processes differ with respect to a property which is crucially important for the $H^2$-measure, as its major mathematical process is addition/subtraction. This property is the difference in the absolute distance between the dividend and the quotient, which is represented by the subtrahend in equation (5) and (6). While the decreasing scenario can only employ a distance between dividend and quotient whose absolute value is smaller than the absolute value of the dividend, the increasing scenario includes a distance between dividend and quotient whose absolute value is equal or greater than the absolute value of the dividend, if the divisor is 0.5 or smaller, which causes zero or positive utility scores, respectively. To further analyze this problem, consider equation (7), which is a rearrangement of equation (6).

$$H_p^2 = \bar{r}_{xp} + |\bar{r}_{xp}|\left(\frac{1}{\sigma_{xp}} - 1\right) \quad (7)$$

The first summand in equation (7) represents the dividend, and the second summand the distance between dividend, the average excess return of the portfolio, and the quotient, the portfolio's utility score. The cause of the invalidity of the $H^2$-measure in the evaluation of portfolios with negative average excess return is the possibility that the second summand's positive value is in absolute terms greater than the first summand's negative value. Thus, to avoid the theoretically impossible outcome of a zero or positive utility score for a negative average excess return portfolio, the sufficient condition has to be fulfilled that the second summand of equation (8) must be smaller than the first summand's absolute value, if a portfolio's average excess return is negative and its excess return standard deviation is below 1. This sufficient condition is shown in equation (8), where $\wedge$ denotes the logical 'and'. Additionally, the second summand in the sufficient condition has to be greater than zero for excess return standard deviations below one to avoid further theoretical inconsistencies, since otherwise the $H^2$-measure would evaluate a portfolio with an excess return standard deviation of one better than a portfolio with equal loss but a lower excess return standard deviation. Rearranging equation (8)'s sufficient condition to the equations (9) and (10) leads to the insights that to ensure the validity of a suggested improvement of the $H^2$-measure, the factor with which the absolute average excess return is multiplied in the second summand of equation (9), which is denoted c, and the portfolio's excess return standard deviation have to be bigger than zero and 0.5, respectively, and smaller than one.

$$|\bar{r}_{xp}| > |\bar{r}_{xp}|\left(\frac{1}{\sigma_{xp}} - 1\right) > 0 \text{ if: } \bar{r}_{xp} < 0 \wedge \sigma_{xp} < 1 \quad (8)$$

$$0 < \frac{1}{\sigma_{xp}} - 1 = c < 1 \text{ if: } \bar{r}_{xp} < 0 \wedge \sigma_{xp} < 1 \quad (9)$$

$$0.5 < \sigma_{xp} < 1 \text{ if: } \bar{r}_{xp} < 0 \wedge \sigma_{xp} < 1 \quad (10)$$

It is impossible to prevent empirically measured excess return standard deviations from taking absolute values of lower than 0.5. Thus, to be able to ensure the sufficient condition of equation (10), it is rewritten in equation (11) as the excess return standard deviation times a factor, labelled d, which has a default value of one, but can be modified to allow the fulfillment of the sufficient condition.

$$0.5 < \sigma_{xp} d < 1 \text{ if: } \bar{r}_{xp} < 0 \wedge \sigma_{xp} < 1 \quad (11)$$

The sufficient condition of equation (11) would be fulfilled, if the d-factor was set in a way, which ensures that its product with any excess return standard deviation below one is always bigger than 0.5 and smaller than 1. This requirement is met in a way which preserves as many of the original Sharpe ratio properties as possible, if the d-factor is set to 'one half plus one divided by two excess return standard deviations', as shown in equation (12). Substituting equation (12) in equation (11) leads to equation (13), which shows that equation (11)'s sufficient condition is fulfilled for any investment performance evaluation of risky portfolios (i.e. portfolios with a positive excess return standard deviation).

$$d = \frac{1}{2} + \frac{1}{2\sigma_{xp}} \text{ if: } \bar{r}_{xp} < 0 \wedge \sigma_{xp} < 1 \quad (12)$$

$$0.5 < \frac{1}{2} + \frac{1}{2}\sigma_{xp} < \Rightarrow 0 < \frac{1}{2}\sigma_{xp} < 0.5 \text{ if: } \bar{r}_{xp} < 0 \wedge \sigma_{xp} < 1 \quad (13)$$

Substituting $\sigma_{xp}$ in the $H^2$-measure as displayed in equation (7) against $\sigma_{xp}d$ with the d-factor being defined according to equation (12) leads to the second suggested solution, the $H^3$-measure. Its simplified version is displayed in equation (14), in which $\vee$ denotes the logical 'or'.

$$H_p^3 = \bar{r}_{xp} + |\bar{r}_{xp}|\left(\frac{1}{\sigma_{xp}} - 1\right) \text{ if: } \bar{r}_{xp} \geq 0 \vee \sigma_{xp} \geq 1 \quad (14)$$

$$H_p^3 = \bar{r}_{xp} + |\bar{r}_{xp}|\left|\frac{1 - \sigma_{xp}}{1 + \sigma_{xp}}\right| \text{ if: } \bar{r}_{xp} < 0 \wedge \sigma_{xp} < 1$$

Figure 4:
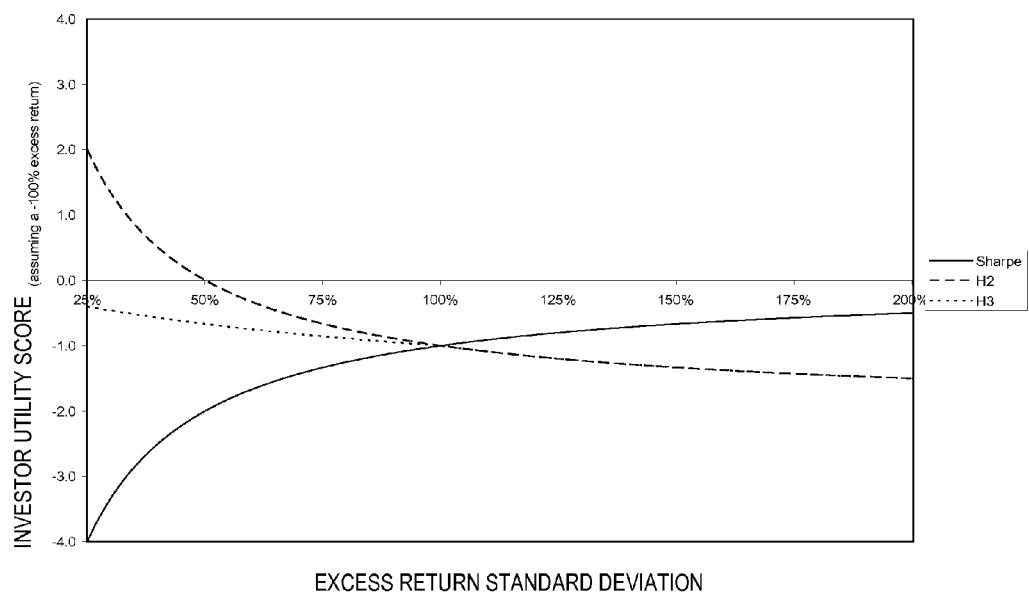
FIG. 4 is a comparison of Sharpe ratio, H$^2$-measure and H$^3$-measure.

As it can be seen from FIG. 4, which is based on the example used in FIGS. 2 and 3, the $H^3$-measure solves the problem of the $H^2$-measure, as it does not lead to positive utility scores. Nevertheless, it preserves as many of the Sharpe ratio properties as possible, which can be seen in two ways from FIG. 4. First, like the $H^2$-measure, the $H^3$-measure has the inverse slope and curvature of the Sharpe ratio for excess return standard deviations of 1 (100%) or higher given negative average excess returns. Second, despite the curvature of the $H^3$-measure for negative excess return standard deviations smaller than 1 has to be different from the $H^2$-measure, it is still a reasonably similar convex curvature, since the underlying process of the $H^2$-measure—the synthetic increasing division process—has been preserved in the $H^3$-measure.

In summary, the $H^3$-measure represents a sufficient and attractive solution for individual investors experiencing a decreasing incremental disutility of risk. It is sufficient, as it solves the negative Sharpe ratio problem and the 'positive utility score for negative average excess return' problem of the $H^2$-measure. It is attractive, because it preserves as many properties as possible of the well regarded Sharpe ratio.

FIG. 4 compares the effect of an incremental increase in an investment's excess return standard deviation on the investor utility score as calculated with the Sharpe ratio, the $H^2$-measure and the $H^3$-measure. While the Sharpe ratio considers investments with higher risk to result in higher utility, the $H^2$-measure penalizes an investment for an increase in risk and therefore can be considered to be a solution to the Sharpe ratio's violation of Markowitz's (1952) E-V rule. However, the $H^2$-measure can lead to positive utility scores for negative average excess return investments. This problem is solved in the $H^3$-measure.

The development of a solution for the curvature problem of the $H^2$-measure's function of investor utility to negative excess return standard deviation comprises a two-step process. In the first step a measure is developed, which addresses the curvature problem in a way sufficient for individual investors experiencing a constant incremental disutility of risk given negative excess returns. This measure is then used in the second step as a basis for the development of a measure which is sufficient for the commonly assumed rational risk averse investor, who is expected to experience a strictly increasing incremental disutility of risk (during loss periods).

Development of a sufficient solution to the negative Sharpe ratio problem, which considers the incremental disutility of risk given negative excess returns to be constant, is based on two requirements. First, a sufficient, theoretically valid solution is required for the negative Sharpe ratio problem (the $H^2$-measure modified in a way that the condition of equation (9) or (10) is fulfilled). Second, a negative linear relation is needed between the risk measure excess return standard deviation and the utility score for the entire range of potential excess return standard deviation values. Such a linear relationship with the utility score, despite positive, is for instance experienced by equation (9)'s c-factor, as shown in equation (15), which represents equation (9) substituted in equation (7)'s $H^2$-measure.

$$H_p^2 = \bar{r}_{xp} + |\bar{r}_{xp}|c \tag{15}$$

Hence, to ensure that both requirements are fulfilled, the c-factor needs to be set in a way that it experiences a negative linear relationship to the excess return standard deviation and fulfills equation (9)'s sufficient condition, which is recalled below.

$$0 < \frac{1}{\sigma_{xp}} - 1 = c < 1 \text{ if}: \bar{r}_{xp} < 0 \wedge \sigma_{xp} < 1 \tag{9}$$

The most straightforward solution to ensure a negative linear relationship between c-factor and the excess return standard deviation is to set the c-factor equal to the negative value of the excess return standard deviation. Unfortunately though, this does not work, as the c-factor has to be greater than 0. However, as c-factor and excess return standard deviation luckily have the same restrictions on the potential values they can take—both have to be between 0 and 1—setting the c-factor to be the negative value of the excess return standard deviation plus one as shown in equation (16) not only ensures a negative linear relationship between c-factor and excess return standard deviation, but also fulfills the condition of the equation (9), which one can see from the substitution of equation (9) in equation (16) presented in equation (17).

$$c = -\sigma_{xp} + 1 \text{ if}: \bar{r}_{xp} < 0 \wedge \sigma_{xp} < 1 \tag{16}$$

$$0 < -\sigma_{xp} + 1 < 1 \Rightarrow 0 < \sigma_{xp} < 1 \text{ if}: \bar{r}_{xp} < 0 \wedge \sigma_{xp} < 1 \tag{17}$$

Finally, the substitution of equation (16) into the $H^2$-measure of equation (15) and the abandonment of equation (16)'s restriction on relevant excess return standard deviation values leads to a sufficient solution to the negative Sharpe ratio problem, which considers the incremental disutility of risk to be constant under the condition of negative excess returns. This solution, the $H^4$-measure, is shown in equation (18).

$$H_p^4 = \bar{r}_{xp} + |\bar{r}_{xp}|\left(\frac{1}{\sigma_{xp}} - 1\right) \text{ if}: \bar{r}_{xp} \geq 0 \tag{18}$$

$$H_p^4 = \bar{r}_{xp}\sigma_{xp} \qquad \text{if}: \bar{r}_{xp} < 0$$

Rearranging the first line of equation (18) to its original Sharpe ratio form as shown in equation (19) allows both terms to be summarized in one. This highlights that the self-derived measure is actually a currently known suggestion to the negative Sharpe ratio problem, since the $H^4$-measure is nothing else than the Israelsen ratio as shown in equation (20). However, as Israelsen applies only to the Sharpe ratio and the Information ratio, this theoretically self-derived solution is in itself original, if applied to any other return to risk ratio.

$$H_p^4 = \frac{\bar{r}_{xp}}{\sigma_{xp}} \qquad \text{if}: \bar{r}_{xp} \geq 0 \tag{19}$$

$$H_p^4 = \bar{r}_{xp}\sigma_{xp} \qquad \text{if}: \bar{r}_{xp} < 0$$

$$H_p^4 = I_p = \frac{\bar{r}_{xp}}{\sigma_{xp}^{(\bar{r}_{xp}/|\bar{r}_{xp}|)}} \tag{20}$$

Figure 5:
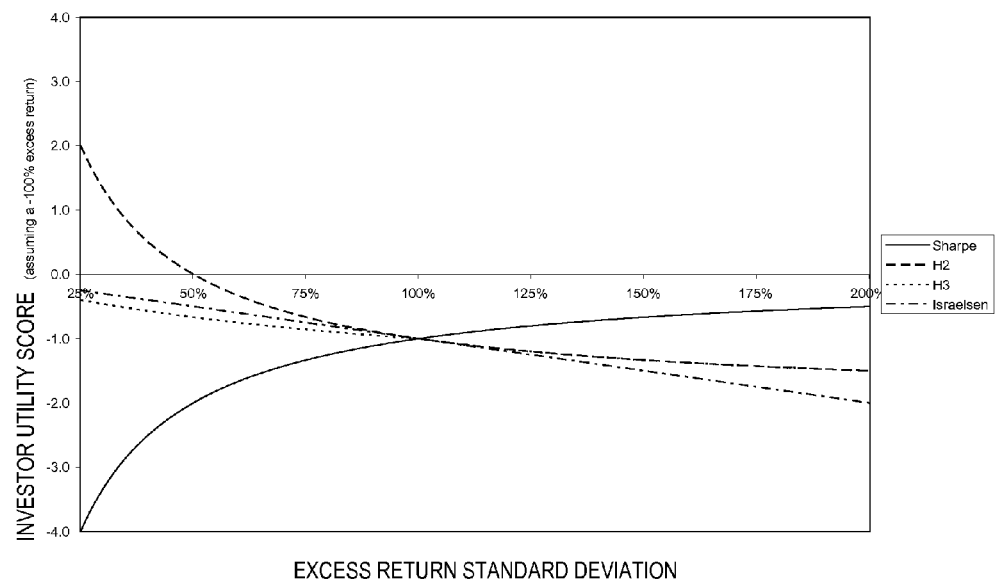
FIG. 5 is a comparison of Sharpe ratio, H$^2$-measure, H$^3$-measure, and Israelsen ratio.

As shown in FIG. 5 for the same example as used in the three previous Figures, the $H^4$-measure neither assumes the risk of an investor facing losses to have a decreasing disutility as the $H^2$- and $H^3$-measure, nor to have an increasing disutility as it follows from the decreasing utility of wealth assumption. In contrast, it displays a linear relationship between risk and disutility in case of negative excess returns. Hence, it represents a sufficient solution to the negative Sharpe ratio problem for specific individual investors who experience a constant incremental disutility of risk when faced with losses.

FIG. 5 uses the same example as FIGS. 2-4 to compare the effect of an incremental increase in an investment's excess return standard deviation on the investor utility score as calculated with the Sharpe ratio, $H^2$-measure, $H^3$-measure and $H^4$-measure. While the Sharpe ratio considers investments with higher risk to result in higher utility, ceteris paribus, the $H^2$-measure penalizes an investment for an increase in risk and therefore can be considered to be a solution to the Sharpe ratio's violation of Markowitz's (1952) E-V rule. However, the $H^2$-measure can lead to positive utility scores for negative average excess return investments. This problem is solved in the $H^3$-measure and the $H^4$-measure, whereby the $H^3$-measure and the $H^4$-measure assume a specific investor to experience a decreasing and constant incremental disutility of risk, respectively.

Since the $H^4$-measure solves the range problem of the $H^2$-measure's function of investor utility to negative excess return standard deviation and displays a linear relation between negative excess return standard deviation and investor utility score, a sufficient, theoretically valid solution to the negative Sharpe ratio problem for the commonly assumed rational risk averse investor, who is expected to experience a strictly increasing incremental disutility of risk given negative excess returns, can be easily developed. The only property which needs to be modified is that the developed measure needs to display a negative linear relationship between investor utility score and the squared negative excess return standard deviation instead of the negative excess return standard deviation itself. This adjustment is made in the $H^5$-measure shown in equation (21), which squares the $H^4$-measure's denominator in case of negative average excess returns.

$$H_p^5 = \frac{\bar{r}_{xp}}{\sigma_{xp}^{1.5(\bar{r}_{xp}/|\bar{r}_{xp}|)-0.5}} \tag{21}$$

Figure 6:
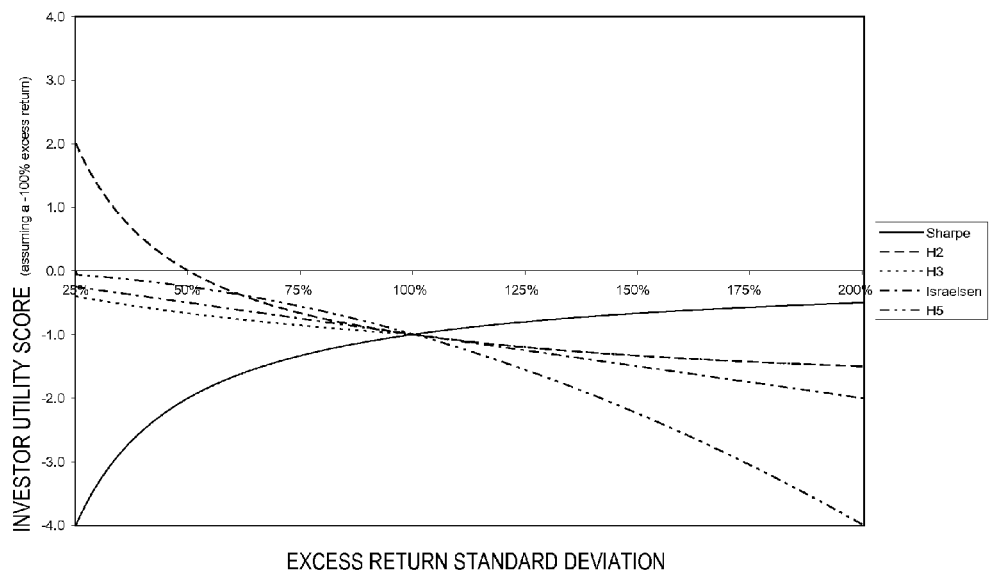
FIG. 6 is a comparison of Sharpe ratio, H$^2$-measure, H$^3$-measure, Israelsen ratio, and H$^5$-measure.

FIG. 6 compares the Sharpe ratio and the $H^2$-measure with the $H^3$-measure, the $H^4$-measure and the $H^5$-measure. While the former two can be considered theoretically invalid for negative average excess return portfolios from an investor utility theory point of view, as the Sharpe ratio assumes an increase in risk to cause an increase in investor utility and the $H^2$-measure can lead to positive utility scores for negative average excess return portfolios; the latter three all appear theoretically valid. Among these three, the $H^3$-measure and $H^4$-measure do not display an increasing incremental disutility of risk given negative excess returns and hence contradict the basic axiom of a rational risk averse investor's strictly decreasing incremental utility of wealth. Nevertheless, as some individual investors probably do not behave as the rational risk averse stereotype, both measures could well be useful for specific individuals. However, the $H^5$-measure, which supports the theoretically expected increasing incremental disutility of risk for negative excess returns as shown in FIG. 6, is very likely of more value for the average investor and hence considered the superior sufficient solution to the negative Sharpe ratio problem.

FIG. 6 compares the effect of an incremental increase in an investment's excess return standard deviation on the investor utility score as calculated with the Sharpe ratio, $H^2$-measure, $H^3$-measure, $H^4$-measure, and $H^5$-measure. While the Sharpe ratio considers investments with higher risk to result in higher utility, the $H^2$-measure penalizes an investment for an increase in risk and therefore can be considered to be a solution to the Sharpe ratio's violation of Markowitz's (1952) E-V rule. However, the $H^2$-measure can lead to positive utility scores for negative average excess return investments. This problem is solved in the $H^3$-measure and the $H^4$-measure, whereby the $H^3$-measure and the $H^4$-measure assume a specific investor to experience a decreasing and constant incremental disutility of risk, respectively. Finally, the $H^5$-measure also solves the $H^2$-measure's problem, but in contrast to the other two solutions, it does not contradict the basic axiom of a rational risk averse investor's strictly decreasing incremental utility of wealth, as it assumes investors to experience an increasing (instead of a decreasing or constant) incremental disutility of risk.

The three presented measures ($H^3$-, $H^4$- and $H^5$-measure) sufficiently solve the negative Sharpe ratio problem and are also theoretically valid in their remaining properties, but they experience the same bias as the Israelsen ratio: the major but unjustified relevance of an excess return standard deviation value of one. The symptom of this bias is that excess return standard deviation values above one lead to small absolute values of positive utility scores but large absolute values of negative utility scores and vice versa. This symptom has, for instance, the effect that the shorter the observation interval is, over which an investment's performance is measured, the greater is the absolute value of positive utility scores and the smaller is the absolute value of negative utility scores ceteris paribus and vice versa. Hence, the presence of this bias in an investment performance evaluation measure represents a severe problem, as it causes ratings to experience a severe lack of reliability and hence prohibits the calculation of any reliable average rating.

To solve this problem, the risk-value of one needs a justified meaning, which provides two functions: First, it represents a reason to expect a sample's average risk value of above one to lead to higher absolute values of negative utility scores than positive utility scores ceteris paribus and vice versa. Second, the justified meaning is invariate to the length of the observation interval. This justified meaning appears best provided, if the risk measure is modified to represent an asset's excess return standard deviation in relation to the overall stock market's benchmark excess return standard deviation.

This risk measure, which has previously been only employed in performance measures suffering from a negative average excess return problem analogous to Sharpe ratio's one is invariate to the length of the observation interval and gives the value of one the meaning of market equivalent total risk. Hence, values above or below one represent abnormally high or abnormally low total risk, respectively. Thus, the adoption of this modified risk definition by the developed performance measures would lead them to evaluate the average of the utility scores of two funds, of which one experiences a positive average excess return of the same size than the other's negative average excess return, as zero, negative or positive, if the two funds experience the same market equivalent, abnormally high or abnormally low total risk, respectively.

However, the calculation of the overall stock market's benchmark excess return standard deviation over the respective sample period would change the nature of the developed measures from investment performance measures adjusting for absolute total risk to measures adjusting for relative total risk, which would lead the developed measures to be more direct improvements of Modigliani and Modigliani's (1997) RAPA measure than of the Sharpe ratio. More problematic though, this would reduce the developed measures' information content on the relative attractiveness of risky assets' average or individual utility compared to the zero excess return, nearly risk free asset's utility, as a risky asset might be evaluated with a risk value below one despite it has a high absolute total risk and vice versa. Similarly, the developed measures' information content on the relative attractiveness of risky assets over time would also be reduced by employing RAPA's risk measure. Thus, while benchmarking the asset's risk against the market's risk over the respective sample period would give the risk value of one a much needed meaning, the time varying nature of the market risk benchmark would introduces undesirable properties into the developed measures.

This problem is addressed by calculating the overall stock market's benchmark excess return standard deviation for the respective observation interval not over the sample period but over the longest available period (i.e. since the start of the market benchmark data record), which would for most applications lead the variability of the market risk benchmark to be inconsequential. Hence, the developed measures would provide the risk value of one with the suggested meaning by rescaling the risk measure, but they would virtually avoid changing the Sharpe ratio's property of adjustment for absolute total risk to adjustment for relative total risk. Thus, these developed measures represent a direct improvement of the Sharpe ratio instead of the RAPA measure.

Consequently, the risk measure in the $H^3$-, $H^4$- and $H^5$-measure is modified to be the asset's excess return standard deviation calculated over the sample period divided by the overall stock market's excess return standard deviation calculated over the longest available period denoted $\sigma_{xmlap}$, which results in the $H^6$-, $H^7$- and $H^8$-measure shown in equation (22), (23) and (24), respectively.

$$H_p^6 = \bar{r}_{xp} + |\bar{r}_{xp}|\left(\frac{\sigma_{xmlap}}{\sigma_{xp}} - 1\right) \quad \text{if}: \bar{r}_{xp} \geq 0 \vee \frac{\sigma_{xp}}{\sigma_{xmlap}} \geq 1 \quad (22)$$

$$H_p^6 = \bar{r}_{xp} + |\bar{r}_{xp}|\frac{\sigma_{xmlap} - \sigma_{xp}}{\sigma_{xmlap} + \sigma_{xp}} \quad \text{if}: \bar{r}_{xp} < 0 \wedge \frac{\sigma_{xp}}{\sigma_{xmlap}} < 1$$

$$H_p^7 = \bar{r}_{xp}\left(\frac{\sigma_{xmlap}}{\sigma_{xp}}\right)^{(\bar{r}_{xp}/|\bar{r}_{xp}|)} \quad (23)$$

$$H_p^8 = \bar{r}_{xp}\left(\frac{\sigma_{xmlap}}{\sigma_{xp}}\right)^{1.5(\bar{r}_{xp}/|\bar{r}_{xp}|)-0.5} \quad (24)$$

The solution of the present invention, is not dependent on the precise definition of the return and risk measure. Hence, whilst the invention has been described with reference to the Sharpe ratio, it can be applied to other performance measurement ratios.

Figure 7:
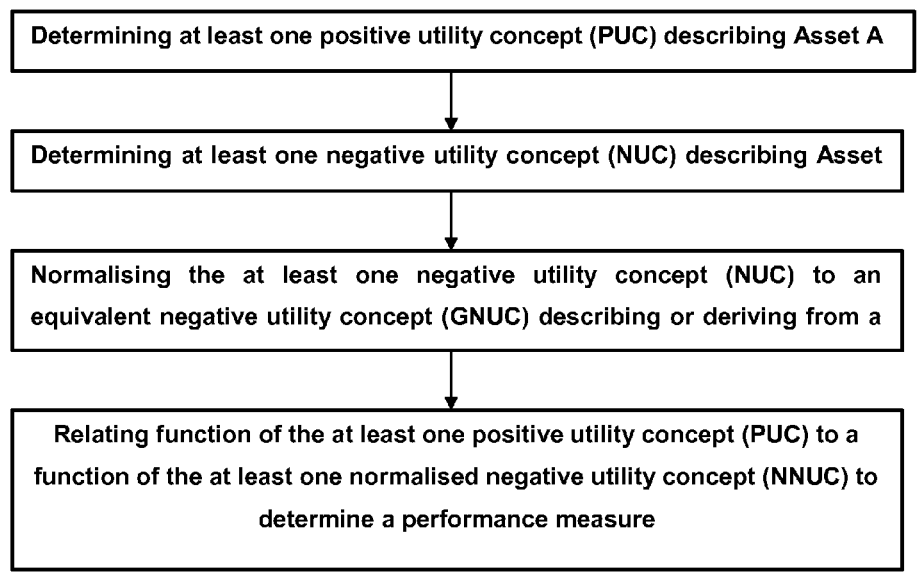
FIG. 7 is a flow diagram of a method for determining a performance measure.
Figure 8:
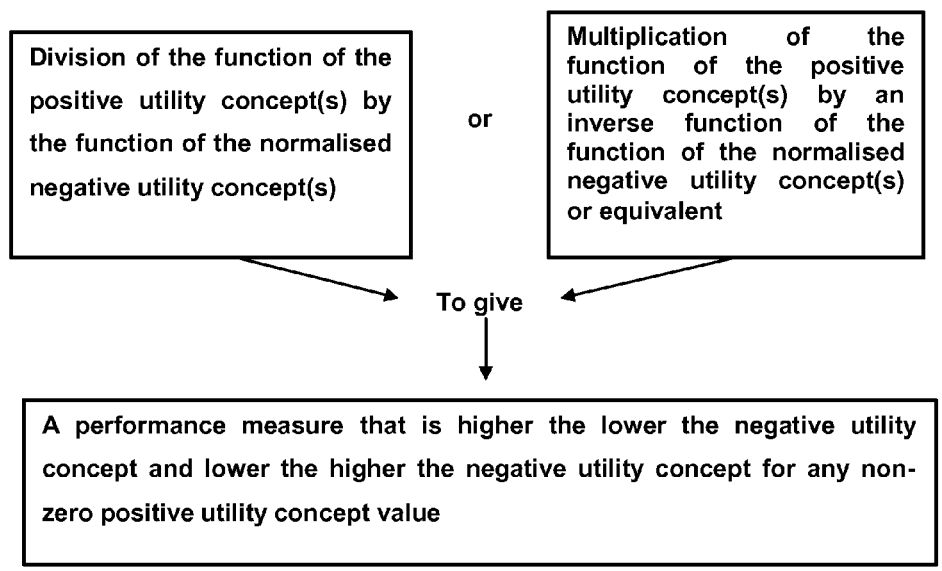
FIG. 8 is a flow diagram of a method for determining a performance measure.
Figure 9:
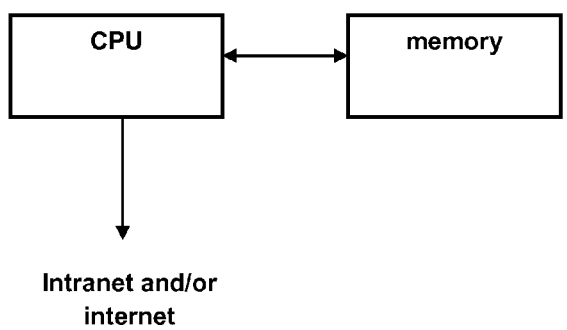
FIG. 9 is block diagram of a system for determining a performance measure.

To apply the invention to other performance measurement ratios, the method can be expressed as a more general method for measuring investment performance of an Asset A. The steps of this method are shown in FIG. 7. It comprises: determining at least one positive utility concept (PUC) describing Asset A; determining at least one negative utility concept (NUC) describing Asset A; and normalizing, using the computer processor, the at least one negative utility concept (NUC) to an equivalent negative utility concept (GNUC) describing or deriving from a group of Assets (N>1). Once this is done, a function of the at least one positive utility concept (PUC) is related to a function of the at least one normalized negative utility concept (NNUC) to determine a performance measure, wherein the step of relating involves division of the function of the positive utility concept(s) by the function of the normalized negative utility concept(s) or multiplication of the function of the positive utility concept(s) by an inverse function of the function of the normalized negative utility concept(s) or equivalent, so the performance measure is higher the lower the negative utility concept and lower the higher the negative utility concept for any non-zero positive utility concept value. The steps of relating the positive and negative utility concepts are shown in FIG. 8. The method of the invention can be implemented on any general purpose computer system that has a processor and memory, for example as shown in FIG. 9. Typically the invention could be implemented on a PC, lap top computer, PDA or any other electronic device with processing capabilities.

The step of relating may be done using the following relationship:

performance measure=$fn_1$(PUC)–$fn_2$[mod($fn_3$(PUC))]·$fn_4$(NNUC)

where $fn_1$ and $fn_3$ is are functions acting on the PUC; $fn_2$ is a function acting on the moulus of ($fn_3$(PUC)) and $fn_4$ is a function acting on the NNUC, wherein $fn_1$ and $fn_3$ may optionally be the same. Optionally, $fn_2$ is multiplication by 1 and the step of relating is done using the following relationship:

performance measure=$fn_1$(PUC)–mod($fn_3$(PUC))·$fn_4$(NNUC).

Based on the above, the following further generalized expressions can be used.

performance measure=$fn_1$(PUC)+$fn$[mod($fn_3$PUC)][1/$fn_5$NNUC–1]

performance measure=$fn_1$(PUC)+$fn$[mod($fn_3$PUC)][($fn$(GNUC)–$fn$(NUC))/($fn$(GNUC)+$fn$(NUC))]

performance measure=$fn_6$(PUC)($fn_7$(GNUC)/$fn_8$NUC))$^{(fn_9 PUC/fn_{10} mod PUC)}$ performance measure=$fn_{11}$(PUC)($fn_{12}$(GNUC)/$fn_{12}$(NUC))$^{((C3+1)fn(PUC)/fn(mod\,PUC))-C4}$ Specific instances of these equations can be expressed as:

$H^6$=PUC+mod(PUC)[1/NNUC–1] if the measure ≥0 or risk measure ≥1

$H^6$=PUC+mod(PUC)[(GNUC–$fn$NUC)/(GNUC+NUC)] if the return measure <0 and risk measure <1

$H^7$=PUC(GNUC/NUC)$^{PUC/mod\,PUC}$ $H^8$=PUC(GNUC/NUC)$^{[1.5PUC/mod\,PUC]-0.5}$ These equations can be used to provide an improved indication of performance using a number of known performance measures. Some examples are outlined below. Definitions of some of the terms are provided later in the text.

Barclay Ratio (BC)

The original formula is:

$$BC_p = \frac{\hat{\gamma}_{\tau p}}{\sigma_{\ddot{u}_p}}$$

Applying the generalized relationship for $H^6$, if the return measure ≥0 or risk measure ≥1 and investor(s) experience(s) a decreasing incremental disutility of risk when facing a negative return measure:

$$BC_p^{H6} = \hat{\gamma}_{\tau p} + |\hat{\gamma}_{\tau p}|\left(\frac{\sigma_{\ddot{u}_{mlap}}}{\sigma_{\ddot{u}_p}} - 1\right)$$

Applying the generalized relationship for $H^6$, if the return measure <0 and risk measure <1 and investor(s) experience(s) a decreasing incremental disutility of risk when facing a negative return measure:

$$BC_p^{H6} = \hat{\gamma}_{\tau p} + |\hat{\gamma}_{\tau p}|\frac{\sigma_{\ddot{u}_{mlap}} - \sigma_{\ddot{u}_p}}{\sigma_{\ddot{u}_{mlap}} + \sigma_{\ddot{u}_p}}$$

Applying the generalized relationship for $H^7$, if investor(s) experience(s) a constant incremental disutility of risk when facing a negative return measure:

$$BC_p^{H7} = \hat{\gamma}_{\tau p}\left(\frac{\sigma_{\ddot{u}_{mlap}}}{\sigma_{\ddot{u}_p}}\right)^{(\hat{\gamma}_{\tau p}/|\hat{\gamma}_{\tau p}|)}$$

Applying the generalized relationship for $H^8$, if investor(s) experience(s) an increasing incremental disutility of risk when facing a negative return measure:

$$BC_p^{H8} = \hat{\gamma}_{\tau p}\left(\frac{\sigma_{\ddot{u}_{mlap}}}{\sigma_{\ddot{u}_p}}\right)^{1.5(\hat{\gamma}_{\tau p}/|\hat{\gamma}_{\tau p}|)-0.5}$$

Burke Ratio (Burke, 1994)

The original formula is:

$$B_p = \frac{\bar{r}_{xp}}{\sqrt{\eta_{2T_p}}}$$

Applying the generalized relationship for $H^6$, if the return measure $\geq 0$ or risk measure $\geq 1$ and investor(s) experience(s) a decreasing incremental disutility of risk when facing a negative return measure:

$$B_p^{H6} = \bar{r}_{xp} + |\bar{r}_{xp}|\left(\frac{\sqrt{\eta_{2Tmlap}}}{\sqrt{\eta_{2T_p}}} - 1\right)$$

Applying the generalized relationship for $H^6$, if the return measure $<0$ and risk measure $<1$ and investor(s) experience(s) a decreasing incremental disutility of risk when facing a negative return measure:

$$B_p^{H6} = \bar{r}_{xp} + |\bar{r}_{xp}|\frac{\sqrt{\eta_{2Tmlap}} - \sqrt{\eta_{2T_p}}}{\sqrt{\eta_{2Tmlap}} + \sqrt{\eta_{2T_p}}}$$

Applying the generalized relationship for $H^7$, if investor(s) experience(s) a constant incremental disutility of risk when facing a negative return measure:

$$B_p^{H7} = \bar{r}_{xp}\left(\frac{\sqrt{\eta_{2Tmlap}}}{\sqrt{\eta_{2T_p}}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$B_p^{H8} = \bar{r}_{xp}\left(\frac{\sqrt{\eta_{2Tmlap}}}{\sqrt{\eta_{2T_p}}}\right)^{1.5(\bar{r}_{xp}/|\bar{r}_{xp}|)-0.5}$$

Double Sharpe Ratio (Morey and Vinod, 2001)
The original formula is:

$$DS_p = \frac{\hat{S}_p}{\sigma_{\hat{S}_p}}$$

Applying the generalized relationship for $H^6$, if the return measure $\geq 0$ or risk measure $\geq 1$ and investor(s) experience(s) a decreasing incremental disutility of risk when facing a negative return measure:

$$DS_p^{H6} = \frac{\hat{H}_p^6}{\sigma_{\hat{H}_p^6}}$$

Applying the generalized relationship for $H^6$, if the return measure $<0$ and risk measure $<1$ and investor(s) experience(s) a decreasing incremental disutility of risk when facing a negative return measure:

$$DS_p^{H6} = \frac{\hat{H}_p^6}{\sigma_{\hat{H}_p^6}}$$

Applying the generalized relationship for $H^7$, if investor(s) experience(s) a constant incremental disutility of risk when facing a negative return measure:

$$DS_p^{H7} = \frac{\hat{H}_p^7}{\sigma_{\hat{H}_p^7}}$$

Applying the generalized relationship for $H^8$, if investor(s) experience(s) an increasing incremental disutility of risk when facing a negative return measure:

$$DS_p^{H8} = \frac{\hat{H}_p^8}{\sigma_{\hat{H}_p^8}}$$

Generalized Sharpe Ratio (Dowd, 2000)
The original formula is:

$$GS_p = \frac{S_p^{new}}{S_p^{old}}$$

Applying the generalized relationship for $H^6$, if the return measure $\geq 0$ or risk measure $\geq 1$ and investor(s) experience(s) a decreasing incremental disutility of risk when facing a negative return measure:

$$GS_p^{H6} = \frac{H_p^{6new}}{H_p^{6old}}$$

Applying the generalized relationship for $H^6$, if the return measure $<0$ and risk measure $<1$ and investor(s) experience(s) a decreasing incremental disutility of risk when facing a negative return measure:

$$GS_p^{H6} = \frac{H_p^{6new}}{H_p^{6old}}$$

Applying the generalized relationship for $H^7$, if investor(s) experience(s) a constant incremental disutility of risk when facing a negative return measure:

$$GS_p^{H7} = \frac{H_p^{7new}}{H_p^{7old}}$$

Applying the generalized relationship for $H^8$, if investor(s) experience(s) an increasing incremental disutility of risk when facing a negative return measure:

$$GS_p^{H8} = \frac{H_p^{8new}}{H_p^{8old}}$$

Kappa$_1$ (Kaplan and Knowles, 2004)
The original formula is:

$$K1_p = \frac{\bar{r}_{xp}}{\kappa_{1p}}$$

Applying the generalized relationship for $H^6$, if the return measure $\geq 0$ or risk measure $\geq 1$ and investor(s) experience(s) a decreasing incremental disutility of risk when facing a negative return measure:

$$K1_p^{H6} = \bar{r}_{xp} + |\bar{r}_{xp}|\left(\frac{\kappa_{1mlap}}{\kappa_{1p}} - 1\right)$$

Applying the generalized relationship for $H^6$, if the return measure <0 and risk measure <1 and investor(s) experience(s) a decreasing incremental disutility of risk when facing a negative return measure:

$$K1_p^{H6} = \bar{r}_{xp} + |\bar{r}_{xp}|\frac{\kappa_{1mlap} - \kappa_{1p}}{\kappa_{1mlap} + \kappa_{1p}}$$

Applying the generalized relationship for $H^7$, if investor(s) experience(s) a constant incremental disutility of risk when facing a negative return measure:

$$K1_p^{H7} = \bar{r}_{xp}\left(\frac{\kappa_{1mlap}}{\kappa_{1p}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$K1_p^{H8} = \bar{r}_{xp}\left(\frac{\kappa_{1mlap}}{\kappa_{1p}}\right)^{1.5(\bar{r}_{xp}/|\bar{r}_{xp}|)-0.5}$$

Kappa$_3$ (Kaplan and Knowles, 2004)
The original formula is:

$$K3_p = \frac{\bar{r}_{xp}}{\sqrt[3]{\kappa_{3p}}}$$

Applying the generalized relationship for $H^6$, if the return measure $\geq 0$ or risk measure $\geq 1$ and investor(s) experience(s) a decreasing incremental disutility of risk when facing a negative return measure:

$$K3_p^{H6} = \bar{r}_{xp} + |\bar{r}_{xp}|\left(\frac{\sqrt[3]{\kappa_{3mlap}}}{\sqrt[3]{\kappa_{3p}}} - 1\right)$$

Applying the generalized relationship for $H^6$, if the return measure <0 and risk measure <1 and investor(s) experience(s) a decreasing incremental disutility of risk when facing a negative return measure:

$$K3_p^{H6} = \bar{r}_{xp} + |\bar{r}_{xp}|\frac{\sqrt[3]{\kappa_{3mlap}} - \sqrt[3]{\kappa_{3p}}}{\sqrt[3]{\kappa_{3mlap}} + \sqrt[3]{\kappa_{3p}}}$$

Applying the generalized relationship for $H^7$, if investor(s) experience(s) a constant incremental disutility of risk when facing a negative return measure:

$$K3_p^{H7} = \bar{r}_{xp}\left(\frac{\sqrt[3]{\kappa_{3mlap}}}{\sqrt[3]{\kappa_{3p}}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$K3_p^{H8} = \bar{r}_{xp}\left(\frac{\sqrt[3]{\kappa_{3mlap}}}{\sqrt[3]{\kappa_{3p}}}\right)^{1.5(\bar{r}_{xp}/|\bar{r}_{xp}|)-0.5}$$

Kestner Ratio (Kestner, 1996)
The original formula is:

$$KE_p = \frac{\hat{\gamma}_{\tau xp}}{l_{\tau xp}}$$

Applying the generalized relationship for $H^6$, if the return measure $\geq 0$ or risk measure $\geq 1$ and investor(s) experience(s) a decreasing incremental disutility of risk when facing a negative return measure:

$$KE_p^{H6} = \hat{\gamma}_{\tau xp} + |\hat{\gamma}_{\tau xp}|\left(\frac{l_{\tau xmlap}}{l_{\tau xp}} - 1\right)$$

Applying the generalized relationship for $H^6$, if the return measure <0 and risk measure <1 and investor(s) experience(s) a decreasing incremental disutility of risk when facing a negative return measure:

$$KE_p^{H6} = \hat{\gamma}_{\tau xp} + |\hat{\gamma}_{\tau xp}|\frac{l_{\tau xmlap} - l_{\tau xp}}{l_{\tau xmlap} + l_{\tau xp}}$$

Applying the generalized relationship for $H^7$, if investor(s) experience(s) a constant incremental disutility of risk when facing a negative return measure:

$$KE_p^{H7} = \hat{\gamma}_{\tau xp}\left(\frac{l_{\tau xmlap}}{l_{\tau xp}}\right)^{(\hat{\gamma}_{\tau xp}/|\hat{\gamma}_{\tau xp}|)}$$

Applying the generalized relationship for $H^8$, if investor(s) experience(s) an increasing incremental disutility of risk when facing a negative return measure:

$$KE_p^{H8} = \hat{\gamma}_{\tau xp}\left(\frac{l_{\tau xmlap}}{l_{\tau xp}}\right)^{1.5(\hat{\gamma}_{\tau xp}/|\hat{\gamma}_{\tau xp}|)-0.5}$$

Modified Sharpe Ratio (Gregoriou and Gueyie, 2003)
The original formula is:

$$MS_p = \frac{\bar{r}_{xp}}{MVaR_p}$$

Applying the generalized relationship for $H^6$, if the return measure $\geq 0$ or risk measure $\geq 1$ and investor(s) experience(s) a decreasing incremental disutility of risk when facing a negative return measure:

$$MS_p^{H6} = \bar{r}_{xp} + |\bar{r}_{xp}|\left(\frac{MVaR_{mlap}}{MVaR_p} - 1\right)$$

Applying the generalized relationship for $H^6$, if the return measure <0 and risk measure <1 and investor(s) experience(s) a decreasing incremental disutility of risk when facing a negative return measure:

$$MS_p^{H6} = \bar{r}_{xp} + |\bar{r}_{xp}|\frac{MVaR_{mlap} - MVaR_p}{MVaR_{mlap} + MVaR_p}$$

Applying the generalized relationship for $H^7$, if investor(s) experience(s) a constant incremental disutility of risk when facing a negative return measure:

$$MS_p^{H6} = \bar{r}_{xp}\left(\frac{MVaR_{mlap}}{MVaR_p}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$MS_p^{H8} = \bar{r}_{xp}\left(\frac{MVaR_{mlap}}{MVaR_p}\right)^{1.5(\bar{r}_{xp}/|\bar{r}_{xp}|)-0.5}$$

Oliver Wyman's Shareholder Performance Index$^{SM}$ (Oliver Wyman, 2007)
The original formula is:

$$SPI_p = \bar{S}_p - \ddot{S}_m$$

Applying the generalized relationship for $H^6$, if the return measure $\geq 0$ or risk measure $\geq 1$ and investor(s) experience(s) a decreasing incremental disutility of risk when facing a negative return measure:

$$SPI_p^{H6} = \overline{H}_p{}^6 - \ddot{H}_m^6$$

Applying the generalized relationship for $H^6$, if the return measure <0 and risk measure <1 and investor(s) experience(s) a decreasing incremental disutility of risk when facing a negative return measure:

$$SPI_p^{H6} = \overline{H}_p{}^6 - \ddot{H}_m^6$$

Applying the generalized relationship for $H^7$, if investor(s) experience(s) a constant incremental disutility of risk when facing a negative return measure:

$$SPI_p^{H7} = \overline{H}_p{}^7 - \ddot{H}_m^7$$

Applying the generalized relationship for $H^8$, if investor(s) experience(s) an increasing incremental disutility of risk when facing a negative return measure:

$$SPI_p^{H8} = \overline{H}_p{}^8 - \ddot{H}_m^8$$

RAPA—Risk Adjusted Performance Alternative$^{VI}$ (Modigliani and Modigliani, 1997)
The original formula is:

$$RAPA_p = \bar{r}_{xp}\frac{\sigma_m}{\sigma_p}$$

Applying the generalized relationship for $H^3$, if the return measure $\geq 0$ or risk measure $\geq 1$ and investor(s) experience(s) a decreasing incremental disutility of risk when facing a negative return measure:

$$RAPA_p^{H3} = \bar{r}_{xp} + |\bar{r}_{xp}|\left(\frac{\sigma_m}{\sigma_p} - 1\right)$$

Applying the generalized relationship for $H^3$, if the return measure <0 and risk measure <1 and investor(s) experience(s) a decreasing incremental disutility of risk when facing a negative return measure:

$$RAPA_p^{H3} = \bar{r}_{xp} + |\bar{r}_{xp}|\frac{\sigma_m - \sigma_p}{\sigma_m + \sigma_p}$$

Applying the generalized relationship for $H^4$, if investor(s) experience(s) a constant incremental disutility of risk when facing a negative return measure:

$$RAPA_p^{H4} = \bar{r}_{xp}\left(\frac{\sigma_m}{\sigma_p}\right)^{(\bar{r}_{xp}/|\bar{r}_{xp}|)}$$

Applying the generalized relationship for $H^5$, if investor(s) experience(s) an increasing incremental disutility of risk when facing a negative return measure:

$$RAPA_p^{H5} = \bar{r}_{xp}\left(\frac{\sigma_m}{\sigma_p}\right)^{1.5(\bar{r}_{xp}/|\bar{r}_{xp}|)-0.5}$$

RoCVaR—Return on Conditional Value at Risk (Eling and Schuhmacher, 2007)

The original formula is:

$$RCV_p = \frac{\bar{r}_{xp}}{CVaR_p}$$

Applying the generalized relationship for $H^6$, if the return measure $\geq 0$ or risk measure $\geq 1$ and investor(s) experience(s) a decreasing incremental disutility of risk when facing a negative return measure:

$$RCV_p^{H6} = \bar{r}_{xp} + |\bar{r}_{xp}|\left(\frac{CVaR_{mlap}}{CVaR_p} - 1\right)$$

Applying the generalized relationship for $H^6$, if the return measure $<0$ and risk measure $<1$ and investor(s) experience(s) a decreasing incremental disutility of risk when facing a negative return measure:

$$RCV_p^{H6} = \bar{r}_{xp} + |\bar{r}_{xp}|\frac{CVaR_{mlap} - CVaR_p}{CVaR_{mlap} - CVaR_p}$$

Applying the generalized relationship for $H^7$, if investor(s) experience(s) a constant incremental disutility of risk when facing a negative return measure:

$$RCV_p^{H7} = \bar{r}_{xp}\left(\frac{CVaR_{mlap}}{CVaR_p}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$RCV_p^{H8} = \bar{r}_{xp}\left(\frac{CVaR_{mlap}}{CVaR_p}\right)^{1.5(\bar{r}_{xp}/|\bar{r}_{xp}|)-0.5}$$

RoPS—Return on Probability of Shortfall (Pedersen and Rudholm-Alfvin, 2003)

The original formula is:

$$RoPS_p = \frac{\bar{r}_{xp}}{\kappa_{0p}}$$

Applying the generalized relationship for $H^6$, if the return measure $\geq 0$ or risk measure $\geq 1$ and investor(s) experience(s) a decreasing incremental disutility of risk when facing a negative return measure:

$$RoPS_p^{H6} = \bar{r}_{xp} + |\bar{r}_{xp}|\left(\frac{\kappa_{0mlap}}{\kappa_{0p}} - 1\right)$$

Applying the generalized relationship for $H^6$, if the return measure $<0$ and risk measure $<1$ and investor(s) experience(s) a decreasing incremental disutility of risk when facing a negative return measure:

$$RoPS_p^{H6} = \bar{r}_{xp} + |\bar{r}_{xp}|\frac{\kappa_{0mlap} - \kappa_{0p}}{\kappa_{0mlap} + \kappa_{0p}}$$

Applying the generalized relationship for $H^7$, if investor(s) experience(s) a constant incremental disutility of risk when facing a negative return measure:

$$RoPS_p^{H7} = \bar{r}_{xp}\left(\frac{\kappa_{0mlap}}{\kappa_{0p}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$RoPS_p^{H8} = \bar{r}_{xp}\left(\frac{\kappa_{0mlap}}{\kappa_{0p}}\right)^{1.5(\bar{r}_{xp}/|\bar{r}_{xp}|)-0.5}$$

RoVaR—Return on Value at Risk (Dowd, 2000)

The original formula is:

$$RV_p = \frac{\bar{r}_{xp}}{VaR_p}$$

Applying the generalized relationship for $H^6$, if the return measure $\geq 0$ or risk measure $\geq 1$ and investor(s) experience(s) a decreasing incremental disutility of risk when facing a negative return measure:

$$RV_p^{H6} = \bar{r}_{xp} + |\bar{r}_{xp}|\left(\frac{VaR_{mlap}}{VaR_p} - 1\right)$$

Applying the generalized relationship for $H^6$, if the return measure $<0$ and risk measure $<1$ and investor(s) experience(s) a decreasing incremental disutility of risk when facing a negative return measure:

$$RV_p^{H6} = \bar{r}_{xp} + |\bar{r}_{xp}|\frac{VaR_{mlap} - VaR_p}{VaR_{mlap} + VaR_p}$$

Applying the generalized relationship for $H^7$, if investor(s) experience(s) a constant incremental disutility of risk when facing a negative return measure:

$$RV_p^{H7} = \bar{r}_{xp}\left(\frac{VaR_{mlap}}{VaR_p}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$RV_p^{H8} = \bar{r}_{xp}\left(\frac{VaR_{mlap}}{VaR_p}\right)^{1.5(\bar{r}_{xp}/|\bar{r}_{xp}|)-0.5}$$

S3-Measure (Ferruz and Sarto, 2004)

The original formula is:

$$S3_p = \frac{\bar{r}_{xp}}{\sigma_p^2}$$

Applying the generalized relationship for $H^6$, if the return measure $\geq 0$ or risk measure $\geq 1$ and investor(s) experience(s) a decreasing incremental disutility of risk when facing a negative return measure:

$$S3_p^{H6} = \bar{r}_{xp} + |\bar{r}_{xp}|\left(\frac{\sigma_{mlap}^2}{\sigma_p^2} - 1\right)$$

Applying the generalized relationship for $H^6$, if the return measure $<0$ and risk measure $<1$ and investor(s) experience(s) a decreasing incremental disutility of risk when facing a negative return measure:

$$S3_p^{H6} = \bar{r}_{xp} + |\bar{r}_{xp}|\frac{\sigma_{mlap}^2 - \sigma_p^2}{\sigma_{mlap}^2 + \sigma_p^2}$$

Applying the generalized relationship for $H^7$, if investor(s) experience(s) a constant incremental disutility of risk when facing a negative return measure:

$$S3_p^{H7} = \bar{r}_{xp}\left(\frac{\sigma_{mlap}^2}{\sigma_p^2}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$S3_p^{H8} = \bar{r}_{xp}\left(\frac{\sigma_{mlap}^2}{\sigma_p^2}\right)^{1.5(\bar{r}_{xp}/|\bar{r}_{xp}|)-0.5}$$

Skewness Adjusted Sharpe Ratio (Koekebakker and Zakamouline, 2007)

The original formula is:

$$SS_p = S_p\sqrt{1 + \frac{b\Lambda_p}{3}S_p}$$

Applying the generalized relationship for $H^6$, if the return measure $\geq 0$ or risk measure $\geq 1$ and investor(s) experience(s) a decreasing incremental disutility of risk when facing a negative return measure:

$$SS_p^{H6} = H_p^6\sqrt{1 + \frac{b\Lambda_p}{3}H_p^6}$$

Applying the generalized relationship for $H^6$, if the return measure $<0$ and risk measure $<1$ and investor(s) experience(s) a decreasing incremental disutility of risk when facing a negative return measure:

$$SS_p^{H6} = H_p^6\sqrt{1 + \frac{b\Lambda_p}{3}H_p^6}$$

Applying the generalized relationship for $H^7$, if investor(s) experience(s) a constant incremental disutility of risk when facing a negative return measure:

$$SS_p^{H7} = H_p^7\sqrt{1 + \frac{b\Lambda_p}{3}H_p^7}$$

Applying the generalized relationship for $H^8$, if investor(s) experience(s) an increasing incremental disutility of risk when facing a negative return measure:

$$SS_p^{H8} = H_p^8\sqrt{1 + \frac{b\Lambda_p}{3}H_p^8}$$

Sortino Ratio (Sortino and van der Meer, 1991)

The original formula is:

$$SO_p = \frac{\bar{r}_{xp}}{\sqrt{\kappa_{2p}}}$$

Applying the generalized relationship for $H^6$, if the return measure $\geq 0$ or risk measure $\geq 1$ and investor(s) experience(s) a decreasing incremental disutility of risk when facing a negative return measure:

$$SO_p^{H6} = \bar{r}_{xp} + |\bar{r}_{xp}|\left(\frac{\sqrt{\kappa_{2mlap}}}{\sqrt{\kappa_{2p}}} - 1\right)$$

Applying the generalized relationship for $H^6$, if the return measure $<0$ and risk measure $<1$ and investor(s) experience(s) a decreasing incremental disutility of risk when facing a negative return measure:

$$SO_p^{H6} = \bar{r}_{xp} + |\bar{r}_{xp}|\frac{\sqrt{\kappa_{2mlap}} - \sqrt{\kappa_{2p}}}{\sqrt{\kappa_{2mlap}} + \sqrt{\kappa_{2p}}}$$

Applying the generalized relationship for $H^7$, if investor(s) experience(s) a constant incremental disutility of risk when facing a negative return measure:

$$SO_p^{H7} = \bar{r}_{xp}\left(\frac{\sqrt{\kappa_{2mlap}}}{\sqrt{\kappa_{2p}}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$SO_p^{H8} = \bar{r}_{xp}\left(\frac{\sqrt{\kappa_{2mlap}}}{\sqrt{\kappa_{2p}}}\right)^{1.5(\bar{r}_{xp}/|\bar{r}_{xp}|)-0.5}$$

Sterling Ratio (e.g. Stein, 1991)

The original formula is:

$$ST_p = \frac{\bar{r}_{xp}}{\eta_{1Tp}}$$

Applying the generalized relationship for $H^6$, if the return measure $\geq 0$ or risk measure $\geq 1$ and investor(s) experience(s) a decreasing incremental disutility of risk when facing a negative return measure:

$$ST_p^{H6} = \bar{r}_{xp} + |\bar{r}_{xp}|\left(\frac{\eta_{1Tmlap}}{\eta_{1Tp}} - 1\right)$$

Applying the generalized relationship for $H^6$, if the return measure $<0$ and risk measure $<1$ and investor(s) experience(s) a decreasing incremental disutility of risk when facing a negative return measure:

$$ST_p^{H6} = \bar{r}_{xp} + |\bar{r}_{xp}|\frac{\eta_{1Tmlap} - \eta_{1Tp}}{\eta_{1Tmlap} + \eta_{1Tp}}$$

Applying the generalized relationship for $H^7$, if investor(s) experience(s) a constant incremental disutility of risk when facing a negative return measure:

$$ST_p^{H7} = \bar{r}_{xp}\left(\frac{\eta_{1Tmlap}}{\eta_{1Tp}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$ST_p^{H8} = \bar{r}_{xp}\left(\frac{\eta_{1Tmlap}}{\eta_{1Tp}}\right)^{1.5(\bar{r}_{xp}/|\bar{r}_{xp}|)-0.5}$$

Symmetric Downside-Risk Sharpe Ratio (Ziemba, 2005)

The original formula is:

$$Z_p = \frac{\bar{r}_{xp}}{\sqrt{2\kappa_{2p}}}$$

Applying the generalized relationship for $H^6$, if the return measure $\geq 0$ or risk measure $\geq 1$ and investor(s) experience(s) a decreasing incremental disutility of risk when facing a negative return measure:

$$Z_p^{H6} = \bar{r}_{xp} + |\bar{r}_{xp}|\left(\frac{\sqrt{2\kappa_{2mlap}}}{\sqrt{2\kappa_{2p}}} - 1\right)$$

Applying the generalized relationship for $H^6$, if the return measure $<0$ and risk measure $<1$ and investor(s) experience(s) a decreasing incremental disutility of risk when facing a negative return measure:

$$Z_p^{H6} = \bar{r}_{xp} + |\bar{r}_{xp}|\frac{\sqrt{2\kappa_{2mlap}} - \sqrt{2\kappa_{2p}}}{\sqrt{2\kappa_{2mlap}} + \sqrt{2\kappa_{2p}}}$$

Applying the generalized relationship for $H^7$, if investor(s) experience(s) a constant incremental disutility of risk when facing a negative return measure:

$$Z_p^{H7} = \bar{r}_{xp}\left(\frac{\sqrt{2\kappa_{2mlap}}}{\sqrt{2\kappa_{2p}}}\right)^{(\bar{r}_{xp}/|\bar{r}_{xp}|)}$$

Applying the generalized relationship for $H^8$, if investor(s) experience(s) an increasing incremental disutility of risk when facing a negative return measure:

$$Z_p^{H8} = \bar{r}_{xp}\left(\frac{\sqrt{2\kappa_{2mlap}}}{\sqrt{2\kappa_{2p}}}\right)^{1.5(\bar{r}_{xp}/|\bar{r}_{xp}|)-0.5}$$

Treynor Index (SSD) (Pedersen and Satchell, 2000)

The original formula is:

$$TI_p = \frac{\bar{r}_{xp}}{\beta_p^{SSD}}$$

Applying the generalized relationship for $H^3$, if the return measure $\geq 0$ or risk measure $\geq 1$ and investor(s) experience(s) a decreasing incremental disutility of risk when facing a negative return measure:

$$TI_p^{H3} = \bar{r}_{xp} + |\bar{r}_{xp}|\left(\frac{1}{\beta_p^{SSD}} - 1\right)$$

Applying the generalized relationship for $H^3$, if the return measure <0 and risk measure <1 and investor(s) experience(s) a decreasing incremental disutility of risk when facing a negative return measure:

$$TI_p^{H3} = \bar{r}_{xp} + |\bar{r}_{xp}| \frac{1 - \beta_p^{SSD}}{1 + \beta_p^{SSD}}$$

Applying the generalized relationship for $H^4$, if investor(s) experience(s) a constant incremental disutility of risk when facing a negative return measure:

$$TI_p^{H4} = \bar{r}_{xp} \left(\frac{1}{\beta_p^{SSD}}\right)^{(r_{xp}/|\bar{r}_{xp}|)}$$

Applying the generalized relationship for $H^5$, if investor(s) experience(s) an increasing incremental disutility of risk when facing a negative return measure:

$$TI_p^{H5} = \bar{r}_{xp} \left(\frac{1}{\beta_p^{SSD}}\right)^{1.5(r_{xp}/|\bar{r}_{xp}|) - 0.5}$$

Treynor Ratio (Treynor, 1965)
The original formula is:

$$T_p = \frac{\bar{r}_{xp}}{\beta_p}$$

Applying the generalized relationship for $H^3$, if the return measure ≥0 or risk measure ≥1 and investor(s) experience(s) a decreasing incremental disutility of risk when facing a negative return measure:

$$T_p^{H3} = \bar{r}_{xp} + |\bar{r}_{xp}| \left(\frac{1}{\beta_p} - 1\right)$$

Applying the generalized relationship for $H^3$, if the return measure <0 and risk measure <1 and investor(s) experience(s) a decreasing incremental disutility of risk when facing a negative return measure:

$$T_p^{H3} = \bar{r}_{xp} + |\bar{r}_{xp}| \frac{1 - \beta_p}{1 + \beta_p}$$

Applying the generalized relationship for $H^4$, if investor(s) experience(s) a constant incremental disutility of risk when facing a negative return measure:

$$T_p^{H4} = \bar{r}_{xp} \left(\frac{1}{\beta_p}\right)^{(r_{xp}/|\bar{r}_{xp}|)}$$

Applying the generalized relationship for $H^5$, if investor(s) experience(s) an increasing incremental disutility of risk when facing a negative return measure:

$$T_p^{H5} = \bar{r}_{xp} \left(\frac{1}{\beta_{xp}}\right)^{1.5(r_{xp}/|\bar{r}_{xp}|) - 0.5}$$

DEFINITIONS $S_p$, $\hat{S}_p$, and $\bar{S}_p$ are portfolio's Sharpe ratio, estimated Sharpe ratio and mean Sharpe ratio; $\breve{S}_m$ is the median Sharpe ratio of the market benchmark companies; $\bar{r}_{xp}$ and $\bar{r}_{xbp}$ represent the average excess return of the portfolio over the risk free rate and the market benchmark, respectively; $\sigma_p$, $\sigma_{xbp}$, $\sigma_m$, $\sigma_{mlap}$, $\sigma_{\hat{u}_p}$, $\sigma_{\hat{u}mlap}$, $\sigma_{\hat{S}_p}$, $\sigma_{\hat{H}_p}^6$, $\sigma_{\hat{H}_p}^7$ and $\sigma_{\hat{H}_p}^8$ are the standard deviation of the portfolio return, the portfolio excess return over $H_p$ the market benchmark, the market return, the market return calculated over the longest available period, the error term of the portfolio's VAMI slop estimation, the error term of the market's VAMI estimation calculated over the longest available period, the estimated Sharpe ratio and the estimated $H^6$-, $H^7$- and $H^8$-measure, respectively; $\Lambda_p$ represents the skewness of the portfolio's return distribution; $\hat{\gamma}_{\tau p}$ and $\hat{\gamma}_{\tau x p}$ are the estimate of the slope of the Value Added Monthly Index (VAMI) based on cumulative return (CR) and cumulative abnormal return (CAR), respectively {VAMI slope estimation (e.g. $\hat{\gamma}_{\tau x p}$):

$$\left\{ VAMI \text{ slope estimation (e.g. } \hat{\gamma}_{\tau p}\text{): } \ln(\tau_{Tp} - 1) = \hat{\gamma}_{\tau p} T + \hat{u}_p / CR_{Np} = \right.$$

$$\tau_p = \prod_{t=1}^{T}(1 + r_{tp})/CAR_{Txp} = \tau_{Txp} = \prod_{t=1}^{T}(1 + r_{tp} - r_{tf}) \bigg\}; \eta_{qTp}$$

and $\kappa_{qp}$ as well as $\eta_{qTmlap}$ and $\kappa_{qmlap}$ are the downside risk measures drawdown (DD) and lower partial moment (LPM) of the portfolio return as well as of the market return calculated over the longest available period, respectively $$\left\{ DD_{qTp} = \eta_{qTp} = \frac{1}{N-1}\sum_{s=1}^{N} DD_{qsTp}/DD_{qsTp} = \right.$$

$$\left| \min\left[\frac{P_{tp} - P_{t-n,p}}{P_{t-n,p}}\right] \right|^q \text{ with } (t = 1, 2, \ldots, T),$$

$$(n = 1, 2, \ldots, T - 1) \text{ and } (n < T) \text{ if } \frac{1}{n}\sum_{m=1}^{m=n}(P_{t-m+1,p} - P_{t-m,p})^0 = -1,$$

otherwise $DD_{qsTp} =$ $$0 / LPM_{qp}(\psi) = \kappa_{qp}(\psi) = \frac{1}{T-1}\sum_{t=1}^{T}\max[(\psi - r_{pt}), 0]^q \bigg\},$$

where $\psi$ is an investor's minimal acceptable return; T and N are the number of observations within an observation period and the number of observation periods (s), respectively; $\beta_p$ and $\beta_p^{SSD}$ are the systematic risk of a portfolio calculated based on the definition of risk as standard deviation and semi-standard deviation (SSD=$(LPM_{2p}(\bar{r}_p))^{1/2}$); VaR$_p$, CVaR$_p$ and MVaR$_p$ as well as VaR$_{mlap}$, CVaR$_{mlap}$ and MVaR$_{mlap}$ denote the absolute value of the Value at Risk, Conditional Value at Risk and Modified Value at Risk of the portfolio return as well as of the market return calculated over the longest available period, whose definitions can be found in Jorion (2007), Agarwal and Naik (2004) and Favre and Galeano (2002), respectively; $l_{txp}$ is Kestner's (1996) return inconsistency measure $$\left\{ l_{\tau xp} = \sqrt{\frac{\Sigma \hat{u}_{xp}^2}{\Sigma (T-\overline{T})^2}} \right\}$$

and b is a constant, which is set in accordance with the assumed investor utility function.

The $H^{6-8}$-measure type solutions enhance investment performance measures which adjust excess return for total risk using, among others, three generic types of downside focused risk measures. These performance measures use different forms of Value at Risk (RoVaR, RoCVar and Modified Sharpe ratio) or lower partial moments (RoPS, $Kappa_1$, Sortino ratio, Symmetric Downside-Risk Sharpe ratio and $Kappa_3$). Both types of downside risk measures have a sophisticated theoretical grounding, whereby the lower partial moment type is even considered to be the preferred alternative to volatility. In contrast, performance measures based on variants of the drawdown risk measure (Burke ratio and Sterling ratio) lack a sophisticated theoretical grounding but are quite popular in the financial profession.

The developed solutions can not only be applied to ratios of return to total risk but also to ratios of return to systematic risk, if one constrains systematic risk to be non-negative. However, as systematic risk is already benchmarked against the market, the negative return problems of the Treynor ratio and the Treynor index (SSD) are solved using $H^{3-5}$-measure type adjustments instead of $H^{6-8}$-measure type adjustments. The presented solutions also improve ratios, which do not only differ in denominator but also in numerator from the Sharpe ratio. A $H^{6-8}$-measure type adjustment advances the Kestner ratio and BarclayHedge's Barclay ratio, which both employ the slope of a Value Added Monthly Index (VAMI) as return measure and adjust it for different risk measures focusing on return inconsistency over time.

Four measures for which the Sharpe ratio represents a component in their investor utility score calculation are substantially improved through the use of the $H^{6-8}$-measure instead of the Sharpe ratio. This group of measures is a good representation of the overall population of more than 20 investment performance measures, to which the developed solutions to the Sharpe ratio's negative return problem are applied, because it is similarly heterogeneous. It consists of a measure introducing an asset's correlation with the market into a Sharpe ratio framework (Generalized Sharpe ratio), a measure of Sharpe ratio estimation certainty (Double Sharpe ratio), a simple, practitioner created measure (Oliver Wyman's Shareholder Performance Index) and a complex, academically developed Sharpe ratio extension (Skewness adjusted Sharpe ratio).

As will be appreciated by one of ordinary skill in the art, the present invention may be embodied as an apparatus (including, for example, a system, machine, device, computer program product, and/or the like), as a method (including, for example, a business process, computer-implemented process, and/or the like), or as any combination of the foregoing. Embodiments of the present invention are described above with reference to flowchart illustrations and a block diagram. It will be understood that blocks of the flowchart illustrations and/or block diagram, and/or combinations of blocks in the flowchart illustrations and/or block diagram, can be implemented by computer-executable program instructions (i.e., computer-executable program code). These computer-executable program instructions may be provided to a processor of a general purpose computer, special purpose computer, or other programmable data processing apparatus to produce a particular machine, such that the instructions, which execute via the processor of the computer or other programmable data processing apparatus, create a mechanism for implementing the functions/acts specified in the flowchart and/or block diagram block or blocks. As used herein, a processor may be "configured to" perform a certain function in a variety of ways, including, for example, by having one or more general-purpose circuits perform the function by executing one or more computer-executable program instructions embodied in a computer-readable medium, and/or by having one or more application-specific circuits perform the function.

These computer-executable program instructions may be stored or embodied in a computer-readable medium to form a computer program product that can direct a computer or other programmable data processing apparatus to function in a particular manner, such that the instructions stored in the computer readable memory produce an article of manufacture including instructions which implement the function/act specified in the flowchart and/or block diagram block(s).

Any combination of one or more computer-readable media/medium may be utilized. In the context of this document, a computer-readable storage medium may be any medium that can contain or store data, such as a program for use by or in connection with an instruction execution system, apparatus, or device. The computer-readable medium may be a transitory computer-readable medium or a non-transitory computer-readable medium.

A transitory computer-readable medium may be, for example, but not limited to, a propagation signal capable of carrying or otherwise communicating data, such as computer-executable program instructions. For example, a transitory computer-readable medium may include a propagated data signal with computer-executable program instructions embodied therein, for example, in base band or as part of a carrier wave. Such a propagated signal may take any of a variety of forms, including, but not limited to, electro-magnetic, optical, or any suitable combination thereof. A transitory computer-readable medium may be any computer-readable medium that can contain, store, communicate, propagate, or transport program code for use by or in connection with an instruction execution system, apparatus, or device. Program code embodied in a transitory computer-readable medium may be transmitted using any appropriate medium, including but not limited to wireless, wireline, optical fiber cable, radio frequency (RF), etc.

A non-transitory computer-readable medium may be, for example, but not limited to, a tangible electronic, magnetic, optical, electromagnetic, infrared, or semiconductor storage system, apparatus, device, or any suitable combination of the foregoing. More specific examples (a non-exhaustive list) of the non-transitory computer-readable medium would include, but is not limited to, the following: an electrical device having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing.

It will also be understood that one or more computer-executable program instructions for carrying out operations of the present invention may include object-oriented, scripted, and/or unscripted programming languages, such as, for example, Java, Perl, Smalltalk, C++, SAS, SQL, Python, Objective C, and/or the like. In some embodiments, the one or more computer-executable program instructions for carrying out operations of embodiments of the present invention are written in conventional procedural programming languages, such as the "C" programming languages and/or similar programming languages. The computer program instructions may alternatively or additionally be written in one or more multi-paradigm programming languages, such as, for example, F#.

The computer-executable program instructions may also be loaded onto a computer or other programmable data processing apparatus to cause a series of operation area steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

Embodiments of the present invention may take the form of an entirely hardware embodiment, an entirely software embodiment (including firmware, resident software, microcode, etc.), or an embodiment combining software and hardware aspects that may generally be referred to herein as a "module," "application," or "system."

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, combinations, and modifications of the just described embodiments can be configured without departing from the scope and spirit of the invention. Therefore, it is to be understood that, within the scope of the appended claims, the invention may be practiced other than as specifically described herein.

A skilled person will appreciate that variations of the disclosed arrangements are possible without departing from the invention. Accordingly the above description of the specific embodiment is made by way of example only and not for the purposes of limitation. It will be clear to the skilled person that minor modifications may be made without significant changes to the operation described.

What is claimed is:

1. A computer processor implemented method for measuring investment performance of asset A, wherein the computer processor is configured to execute stored computer-readable program code to:
    determining at least one positive utility concept (PUC) describing the Asset A;
    determining at least one negative utility concept (NUC) describing the Asset A;
    normalizing the at least one negative utility concept (NUC) to an equivalent negative utility concept (GNUC) describing or deriving from a group of more than one Asset (N>1); and
    relating a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the negative utility concept and lower the higher the negative utility concept for any non-zero positive utility concept value,
    wherein the step of relating is done using the following relationship:

performance measure=$fn_1$(PUC)-$fn(fn_2$[mod($fn_3$(PUC))]$fn_4$(NNUC))

where $fn_1$ and $fn_3$ are functions acting on the PUC; $fn_2$ is a function acting on the modulus of ($fn_3$(PUC)) and $fn_4$ is a function acting on the NNUC, wherein fn is a function acting on $fn_2$[mod($fn_3$(PUC))] and $fn_4$(NNUC).

2. A computer processor implemented method as claimed in claim 1 wherein $fn_2$ is multiplication by 1 and the step of relating is done using the following relationship:

performance measure=$fn_1$(PUC)-mod($fn_3$(PUC))·$fn_4$(NNUC).

3. A computer processor implemented method as claimed in claim 1 wherein the step of relating is done using the following relationship:

performance measure=$fn_1$(PUC)-$fn_2$[mod($fn_3$(PUC))][$C_1$-$C_2$/$fn_5$(NNUC)]

where $C_1$ and $C_2$ are constants, and $fn_{1-5}$ represent functions.

4. A computer processor implemented method as claimed in claim 3 wherein the step of relating is done using the following relationship:

performance measure=$fn_1$[PUC]+$fn$[mod($fn_3$(PUC))][1/$fn_5$(NNUC)-1].

5. A computer processor implemented method as claimed in claim 1 wherein the step of relating is done using the following relationship:

performance measure=$fn_1$(PUC)+$fn$[mod($fn_3$PUC)][($fn$(GNUC)-$fn$(NUC))/($fn$(GNUC)+$fn$(NUC))].

6. A computer processor implemented method for measuring investment performance of asset A, wherein the computer processor is configured to execute stored computer-readable program code to:
    determining at least one positive utility concept (PUC) describing the Asset A;
    determining at least one negative utility concept (NUC) describing the Asset A;
    normalizing the at least one negative utility concept (NUC) to an equivalent negative utility concept (GNUC) describing or deriving from a group of more than one Asset (N>1); and
    relating a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the negative utility concept and lower the higher the negative utility concept for any non-zero positive utility concept value, wherein the step of relating is done using the following relationship:

$$\text{performance measure} = fn_6 PUC(fn_7 GNUC/fn_8 NUC)^{(fn_9 PUC/fn_{10} \mod PUC)}$$

wherein $fn_{6-10}$ are functions, and wherein the value of the performance measure is not equal to either 0 or 1.

7. A computer processor implemented method for measuring investment performance of asset A, wherein the computer processor is configured to execute stored computer-readable program code to:
   determining at least one positive utility concept (PUC) describing the Asset A;
   determining at least one negative utility concept (NUC) describing the Asset A;
   normalizing the at least one negative utility concept (NUC) to an equivalent negative utility concept (GNUC) describing or deriving from a group of more than one Asset (N>1); and
   relating a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the negative utility concept and lower the higher the negative utility concept for any non-zero positive utility concept value,
   wherein the step of relating is done using the following relationship:

$$\text{performance measure} = fn_{11}[PUC(fn_{12}GNUC/fn_{12}NUC)^{((C3+1)fnPUC/fn \mod PUC)-C4}],$$

and wherein the value of the performance measure is not equal to either 0 or 1.

8. A computer processor implemented method as claimed in claim 1 wherein the positive utility concept describes or is a function of the Asset A's return.

9. A computer processor implemented method as claimed in claim 1 wherein the positive utility concept describes or is a function of Asset A's excess return over a risk free rate.

10. A computer processor implemented method as claimed in claim 1 wherein the positive utility concept describes or is a function of Asset A's excess return over a risk free rate and the negative utility concept describes or is a function of Asset A's return deviation.

11. A computer processor implemented method as claimed in claim 10 wherein the return deviation of the group of more than one Asset (N>1) is measured over the longest available sample period.

12. A computer processor implemented method as claimed in claim 1 wherein the positive utility concept describes or is a function of Asset A's excess return over a risk free rate and the negative utility concept describes or is a function of Asset A's excess return standard deviation.

13. A computer processor implemented method as claimed in claim 12 wherein the excess return standard deviation of the group of more than one Asset (N>1) is measured over the longest available sample period.

14. An apparatus comprising:
   a memory for storing at least one positive utility concept (PUC) describing Asset A and at least one negative utility concept (NUC) describing Asset A; and
   a computer processor communicably coupled to the memory and configured to use the at least one positive utility concept (PUC) and at least one negative utility concept to:
      normalize the at least one negative utility concept (NUC) to an equivalent negative utility concept (GNUC) describing or deriving from a group of more than one Asset (N>1); and
      relate, using the computer processor, a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the at least one negative utility concept and lower the higher the at least one negative utility concept for any non-zero positive utility concept value,
   wherein the relating is done using the following relationship:

$$\text{performance measure} = fn_1(PUC) - fn(fn_2[\mod(fn_3(PUC))]fn_4(NNUC))$$

where $fn_1$ and $fn_3$ are functions acting on the PUC; $fn_2$ is a function acting on the modulus of $(fn_3(PUC))$ and $fn_4$ is a function acting on the NNUC, wherein fn is a function acting on $fn_2[\mod(fn_3(PUC))]$ and $fn_4$ (NNUC).

15. A computer program product comprising a non-transitory computer-readable medium, the non-transitory computer-readable medium comprising computer-executable program instructions stored therein, the computer-executable program instructions being configured for:
   determining at least one positive utility concept (PUC) describing Asset A;
   determining at least one negative utility concept (NUC) describing Asset A, wherein the negative utility concept is a function of a third or higher moment of the return distribution of Asset A, a non-linear function of the difference between the return of Asset A and the return of a market benchmark, a function describing a proportional relation between the return distribution of Asset A and the return distribution at least one related asset such as the market benchmark or a combination of the return distribution of Asset A and at least one other risk characteristics of Asset A; and
   relating, using a computer processor, a function of the at least one positive utility concept (PUC) to a function of the at least one negative utility concept (NUC) to determine a performance measure, wherein the step of relating involves division of the function of the at least one positive utility concept by the function of the at least one negative utility concept or multiplication of the function of the at least one positive utility concept by an inverse function of the function of the at least one negative utility concept or equivalent, so the performance measure is higher the lower the risk and lower the higher the risk for any non-zero positive utility concept value,
   wherein the relating is done using the following relationship:

$$\text{performance measure} = fn_1(PUC) - fn(fn_2[\mod(fn_3(PUC))]fn_4(NNUC))$$

where $fn_1$ and $fn_3$ are functions acting on the PUC; $fn_2$ is a function acting on the modulus of ($fn_3$(PUC)) and $fn_4$ is a function acting on the NNUC, wherein fn is a function acting on $fn_2[mod(fn_3(PUC))]$ and $fn_4$(NNUC).

16. A computer program product as claimed in claim 15 wherein fn is multiplication of $fn_2[mod(fn_3(PUC))]$ and $fn_4$(NNUC).

17. A computer program product as claimed in claim 15 wherein $fn_1$ and $fn_3$ are the same function.

18. A computer processor implemented method as claimed in claim 1, wherein fn is multiplication of $fn_2[mod(fn_3(PUC))]$ and $fn_4$(NNUC).

19. A computer processor implemented method as claimed in claim 1, wherein $fn_1$ and $fn_3$ are the same function.

20. A computer processor implemented method as claimed in claim 6 wherein the positive utility concept describes or is a function of the Asset A's return.

21. A computer processor implemented method as claimed in claim 6 wherein the positive utility concept describes or is a function of Asset A's excess return over a risk free rate.

22. A computer processor implemented method as claimed in claim 6 wherein the positive utility concept describes or is a function of Asset A's excess return over a risk free rate and the negative utility concept describes or is a function of Asset A's return deviation.

23. A computer processor implemented method as claimed in claim 22 wherein the return deviation of the group of more than one Asset (N>1) is measured over the longest available sample period.

24. A computer processor implemented method as claimed in claim 6 wherein the positive utility concept describes or is a function of Asset A's excess return over a risk free rate and the negative utility concept describes or is a function of Asset A's excess return standard deviation.

25. A computer processor implemented method as claimed in claim 24 wherein the excess return standard deviation of the group of more than one Asset (N>1) is measured over the longest available sample period.

26. A computer processor implemented method as claimed in claim 7 wherein the positive utility concept describes or is a function of the Asset A's return.

27. A computer processor implemented method as claimed in claim 7 wherein the positive utility concept describes or is a function of Asset A's excess return over a risk free rate.

28. A computer processor implemented method as claimed in claim 7 wherein the positive utility concept describes or is a function of Asset A's excess return over a risk free rate and the negative utility concept describes or is a function of Asset A's return deviation.

29. A computer processor implemented method as claimed in claim 28 wherein the return deviation of the group of more than one Asset (N>1) is measured over the longest available sample period.

30. A computer processor implemented method as claimed in claim 7 wherein the positive utility concept describes or is a function of Asset A's excess return over a risk free rate and the negative utility concept describes or is a function of Asset A's excess return standard deviation.

31. A computer processor implemented method as claimed in claim 30 wherein the excess return standard deviation of the group of more than one Asset (N>1) is measured over the longest available sample period.

32. An apparatus as claimed in claim 14 wherein fn is multiplication of $fn_2[mod(fn_3(PUC))]$ and $fn_4$(NNUC).

33. An apparatus as claimed in claim 14 wherein $fn_1$ and $fn_3$ are the same function.

34. An apparatus comprising:
a memory for storing at least one positive utility concept (PUC) describing Asset A and at least one negative utility concept (NUC) describing Asset A; and
a computer processor communicably coupled to the memory and configured to use the at least one positive utility concept (PUC) and at least one negative utility concept to:
  normalize the at least one negative utility concept (NUC) to an equivalent negative utility concept (GNUC) describing or deriving from a group of more than one Asset (N>1); and
  relate, using the computer processor, a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the at least one negative utility concept and lower the higher the at least one negative utility concept for any non-zero positive utility concept value,
wherein the step of relating is done using the following relationship:

$$\text{performance measure} = fn_6 PUC (fn_7 GNUC / fn_8 NUC)^{(fn_9 PUC/fn_{10} \bmod PUC)}$$

wherein $fn_{6-10}$ are functions, and wherein the value of the performance measure is not equal to either 0 or 1.

35. A computer program product comprising a non-transitory computer-readable medium, the non-transitory computer-readable medium comprising computer-executable program instructions stored therein, the computer-executable program instructions being configured for:
  determining at least one positive utility concept (PUC) describing Asset A;
  determining at least one negative utility concept (NUC) describing Asset A, wherein the negative utility concept is a function of a third or higher moment of the return distribution of Asset A, a non-linear function of the difference between the return of Asset A and the return of a market benchmark, a function describing a proportional relation between the return distribution of Asset A and the return distribution at least one related asset such as the market benchmark or a combination of the return distribution of Asset A and at least one other risk characteristics of Asset A; and
  relating, using a computer processor, a function of the at least one positive utility concept (PUC) to a function of the at least one negative utility concept (NUC) to determine a performance measure, wherein the step of relating involves division of the function of the at least one positive utility concept by the function of the at least one negative utility concept or multiplication of the function of the at least one positive utility concept by an inverse function of the function of the at least one negative utility concept or equivalent, so the performance measure is higher the lower the risk and lower the higher the risk for any non-zero positive utility concept value, wherein the step of relating is done using the following relationship:

$$\text{performance measure} = fn_6 \text{PUC}(fn_7 \text{GNUC}/fn_8 \text{NUC})^{(fn_9 PUC/fn_{10} \bmod PUC)}$$

wherein $fn_{6\text{-}10}$ are functions, and wherein the value of the performance measure is not equal to either 0 or 1.

36. An apparatus comprising:
a memory for storing at least one positive utility concept (PUC) describing Asset A and at least one negative utility concept (NUC) describing Asset A; and
a computer processor communicably coupled to the memory and configured to use the at least one positive utility concept (PUC) and at least one negative utility concept to:
normalize the at least one negative utility concept (NUC) to an equivalent negative utility concept (GNUC) describing or deriving from a group of more than one Asset (N>1); and
relate, using the computer processor, a function of the at least one positive utility concept (PUC) and a function of the at least one normalized negative utility concept (NNUC) to determine a performance measure, wherein the step of relating involves division of the function of the at least one positive utility concept by the function of the at least one normalized negative utility concept or multiplication of the function of the at least one positive utility concept by an inverse function of the function of the at least one normalized negative utility concept or equivalent, so the performance measure is higher the lower the at least one negative utility concept and lower the higher the at least one negative utility concept for any non-zero positive utility concept value,
wherein the step of relating is done using the following relationship:

$$\text{performance measure} = fn_{11}[\text{PUC}(fn_{12}\text{GNUC}/fn_{12}\text{NUC})^{((C3+1)fnPUC/fn \bmod PUC)-C4}],$$

and wherein the value of the performance measure is not equal to either 0 or 1.

37. A computer program product comprising a non-transitory computer-readable medium, the non-transitory computer-readable medium comprising computer-executable program instructions stored therein, the computer-executable program instructions being configured for:
determining at least one positive utility concept (PUC) describing Asset A;
determining at least one negative utility concept (NUC) describing Asset A, wherein the negative utility concept is a function of a third or higher moment of the return distribution of Asset A, a non-linear function of the difference between the return of Asset A and the return of a market benchmark, a function describing a proportional relation between the return distribution of Asset A and the return distribution at least one related asset such as the market benchmark or a combination of the return distribution of Asset A and at least one other risk characteristics of Asset A; and
relating, using a computer processor, a function of the at least one positive utility concept (PUC) to a function of the at least one negative utility concept (NUC) to determine a performance measure, wherein the step of relating involves division of the function of the at least one positive utility concept by the function of the at least one negative utility concept or multiplication of the function of the at least one positive utility concept by an inverse function of the function of the at least one negative utility concept or equivalent, so the performance measure is higher the lower the risk and lower the higher the risk for any non-zero positive utility concept value,
wherein the step of relating is done using the following relationship:

$$\text{performance measure} = fn_{11}[\text{PUC}(fn_{12}\text{GNUC}/fn_{12}\text{NUC})^{((C3+1)fnPUC/fn \bmod PUC)-C4}],$$

and wherein the value of the performance measure is not equal to either 0 or 1.

* * * * *